United States Patent
Lau et al.

(10) Patent No.: US 9,806,774 B2
(45) Date of Patent: Oct. 31, 2017

(54) CSI FEEDBACK REDUCTION FOR MIMO INTERFERENCE ALIGNMENT

(71) Applicant: Taiwan Semiconductor Manufacturing Company, Ltd., Hsinchu (TW)

(72) Inventors: Vincent Kin Nang Lau, New Territories (HK); Xiongbin Rao, Kowloon (HK); Liangzhong Ruan, Kowloon (HK)

(73) Assignee: TAIWAN SEMICONDUCTOR MANUFACTURING COMPANY, LTD., Hsinchu (TW)

( * ) Notice: Subject to any disclaimer, the term of this patent is extended or adjusted under 35 U.S.C. 154(b) by 0 days.

(21) Appl. No.: 14/250,117

(22) Filed: Apr. 10, 2014

(65) Prior Publication Data

US 2015/0071368 A1 Mar. 12, 2015

Related U.S. Application Data

(60) Provisional application No. 61/875,632, filed on Sep. 9, 2013.

(51) Int. Cl.
*H04B 7/04* (2017.01)
*H04B 7/0417* (2017.01)
(Continued)

(52) U.S. Cl.
CPC ......... *H04B 7/0417* (2013.01); *H04B 7/063* (2013.01); *H04B 7/0626* (2013.01); *H04B 7/0634* (2013.01); *H04B 7/0639* (2013.01); *H04B 7/0647* (2013.01); *H04B 7/0456* (2013.01); *H04B 7/0617* (2013.01); *H04L 1/0029* (2013.01)

(58) Field of Classification Search
CPC .. H04B 7/0417; H04B 7/0452; H04B 7/0456; H04B 7/0486; H04B 7/0617; H04B 7/0626; H04B 7/0639; H04B 7/063; H04B 7/0634; H04B 7/0647; H04L 1/0029
See application file for complete search history.

(56) References Cited

U.S. PATENT DOCUMENTS

2012/0289267 A1* 11/2012 Seo ............... H04B 7/0417 455/501
2014/0219373 A1* 8/2014 Mobasher ......... H04B 7/0486 375/267

OTHER PUBLICATIONS

Wei Dai; Youjian Liu; Rider, B., "Quantization Bounds on Grassmann Manifolds and Applications to MIMO Communications," Information Theory, IEEE Transactions on, vol. 54, No. 3, pp. 1108, 1123, Mar. 2008.*

(Continued)

*Primary Examiner* — Michelle M Koeth
(74) *Attorney, Agent, or Firm* — Haynes and Boone, LLP

(57) ABSTRACT

Channel state information (CSI) is reduced for a multi input multi output (MIMO) channel, in which feeding back a part of the CSI matrix is sufficient to align interference in a MIMO network. A feedback dimension quantifies a cost of the CSI feedback of the interference in the MIMO network. A feedback profile is determined that achieves a tradeoff between degrees of freedom, antenna resources and the cost of the feedback. The feedback profile parameterizes a feedback function, which determines how the CSI matrices are fed back to the transmitter. The precoders of the network are adaptive to only the partial CSI knowledge at the transmitter.

31 Claims, 18 Drawing Sheets

(51) Int. Cl.
        *H04L 1/02*      (2006.01)
        *H04B 7/0456*    (2017.01)
        *H04L 1/00*      (2006.01)
        *H04B 7/06*      (2006.01)

(56)                References Cited

OTHER PUBLICATIONS

Rezaee, M.; Guillaud, M., "Limited feedback for interference alignment in the K-user MIMO Interference Channel," Information Theory Workshop (ITW), 2012 IEEE, vol., No., pp. 667, 671, Sep. 3-7, 2012.*
Host-Madsen, et al. "The multiplexing gain of wireless networks," in Proc. IEEE ISIT '05, Sep. 2005, 5 pages.
Cadambe, et al. "Interference Alignment and Degrees of Freedom of the K-User Interference Channel" IIEEE Transactions on Information Theory, vol. 54, No. 8, Aug. 2008, pp. 3425-3441.
Jafar, et al. "Degrees of Freedom Region of the MIMO X Channel" IEEE Transactions on Information Theory, vol. 54, No. 1, Jan. 2008, pp. 151-170.
Gou et al., "Degrees of Freedom of the K User M x N MIMO Interference Channel", IEEE Trans. Inf. Theory, vol. 56, No. 12, Dec. 2010, Retrieved on Jul. 11, 2014, 20 pages.
Gomadam, et al., "A Distributed Numerical Approach to Interference Alignment and Applications to Wireless Interference Networks" IEEE Transactions on Information Theory, vol. 57, No. 6, Jun. 2011, pp. 3309-3322.
Peters, et al., "Cooperative Algorithms for MIMO Interference Channels" IEEE Transactions on Vehicular Technology, vol. 60, No. 1, Jan. 2011, pp. 206-218.
Santamaria, et al., "Maximum Sum-Rate Interference Alignment Algorithms for MIMO Channels" in Proc. IEEE GLOBECOM'10, Dec. 2010, pp. 1-6.
Nosrat-Makouei, et al. "MIMO Interference Alignment Over Correlated Channels With Imperfect CSI" IEEE Transactions on Signal Processing, vol. 59, No. 6, Jun. 2011, pp. 2783-2794.
Thukral, et al., "Interference Alignment with Limited Feedback" in Proc. IEEE ISIT '09, Jul. 2009, 5 pages.
Krishnamachari, et al., "Interference Alignment Under Limited Feedback for MIMO Interference Channels" in Proc. IEEE ISIT '10, Jun. 2010, pp. 619-623.
Ayach, et al., "Interference Alignment with Analog Channel State Feedback" IEEE Transactions on Wireless Communications, vol. 11, No. 2, Feb. 2012, pp. 626-636.
X. Rao, L. Ruan, and V. Lau, "Limited feedback design for interference alignment on MIMO interference networks with asymmetric path loss and spatial correlations," in Proc. IEEE ICUFN'12, Jul. 2012, pp. 446-451.
Ayach, et al., "Grassmannian differential limited feedback for interference alignment," IEEE Transactions on Signal Processing, vol. 60, No. 12, Dec. 2012, 14 pages.
Dundas, "Differential topology", Jan. 12, 2009. [Online]. Available: http://folk.uib.no/nmabd/dt/080627dt09.pdf. Retrieved on Sep. 16, 2014, 206 pages.
Dai, et al., "Quantization Bounds on Grassmann Manifolds and Applications to MIMO Communications" IEEE Transactions on Information Theory, vol. 54, No. 3, Mar. 2008, pp. 1108-1123.
Cho, et al., "Feedback-topology designs for interference alignment in MIMO interference channels," IEEE Transactions on Signal Processing, vol. 60, No. 12, Dec. 2012, 15 pages.
Yetis, et al., "On feasibility of interference alignment in MIMO interference networks," IEEE Transactions on Signal Processing, vol. 58, No. 9, Sep. 2010, pp. 4771-4782.
Cox, et al., "Using algebraic geometry." Springer, 2005, vol. 185. Retrieved on Jul. 11, 2014, 581 pages.
Razaviyayn, et al., "On the degrees of freedom achievable through interference alignment in a MIMO interference channel," IEEE Transactions on Signal Processing, vol. 60, No. 2, Feb. 2012, pp. 812-821.
Ruan, et al., "The feasibility conditions for interference alignment in MIMO networks," arXiv preprint arXiv:1211.3484, Nov. 2012. [Online]. Available: http://arxiv.org/abs/1211.3484. Retrieved on Jul. 11, 2014, 12 pages.
Mondal, et al., "Quantization on the grassmann manifold," IEEE Transactions on Signal Processing, vol. 55, No. 8, Aug. 2007, pp. 4208-4216.
Rezaee, et al., "Interference alignment with quantized grassmannian feedback in the k-user MIMO interference channel," arXiv preprint arXiv:1207.6902, Jan. 2013. [Online]. Available: http://arxiv.org/abs/1207.6902. Retrieved on Jul. 11, 2014, 20 pages.
Tse, et a., "Fundamentals of wireless communication". Cambridge Univ Pr, 2005. Retrieved on Jul. 11, 2014, 587 pages.
J.-S. Kim, S.-H. Moon, S.-R. Lee, and I. Lee, "A new channel quantization strategy for MIMO interference alignment with limited feedback," IEEE Transactions on Wireless Communications, vol. 11, No. 1, Jan. 2012, pp. 358-366.
X. Feng and Z. Zhang, "The rank of a random matrix," Applied mathematics and computation, vol. 185, No. 1, pp. 689-694, 2007, retrieved on Sep. 15, 2014.
Schrijver, "On the history of the transportation and maximum flow problems," Mathematical Programming, vol. 91, No. 3, pp. 437-445, Feb. 2002.
Cormen, et al., "Introduction to algorithms." The MIT press, Sep. 1, 2001. 1202 pages.
J. Bunch and J. Hopcroft, "Triangular factorization and inversion by fast matrix multiplication," Mathematics of Computation, vol. 28, No. 125, pp. 231-236, Jan. 1974.

* cited by examiner

CSI FEEDBACK REDUCTION FOR MIMO INTERFERENCE ALIGNMENT

PRIORITY CLAIM

This application claims priority to U.S. Provisional Patent Application No. 61/875,632, filed on Sep. 9, 2013, and entitled "LOW COMPLEXITY INTERFERENCE ALIGNMENT FOR MIMO INTERFERENCE NETWORKS WITH SMALL CSI FEEDBACK COST," the entirety of which is incorporated herein by reference.

TECHNICAL FIELD

This disclosure relates generally to wireless communications in connection with a multiple input multiple output systems, including mitigating interference and reducing feedback for interference alignment.

BACKGROUND

Interference is a difficult problem in wireless communications. For instance, the capacity region of two-user Gaussian interference channels has been an open problem for over thirty years. Recently, there have been some studies regarding interference and interference alignment (IA) techniques.

In this regard, IA systems generally function to reduce a dimension of aggregated interference by aligning interference from different transmitters into a lower dimension subspace at each receiver, however, conventional systems experience real-world challenges and have not been feasible for a variety of reasons. The above-described contextual background regarding IA techniques is merely intended to provide a general overview of current technologies, and is not intended to be exhaustive.

SUMMARY

Herein, various embodiments, e.g., systems, methods, apparatus, etc., described employ precoder and decoder design(s) in consideration of partial channel state information (CSI) feedback of a multiple input multiple output (MIMO) interference channel. For example, a system is disclosed comprising a memory storing executable components, and a processor, communicatively coupled to the memory, that facilitates execution of the executable components. The executable components can comprise a feedback component configured to retrieve a set of partial channel state information as feedback of an interference network comprising a number of data streams in a MIMO channel, and to facilitate interference alignment of the number of data streams in the MIMO channel. A precoder component can be configured to encode a signal in a data stream of the number of data streams as a function of the set of partial channel state information.

In another embodiment, a device, comprising a processor, is communicatively coupled to a memory that facilitates execution of the executable components. The executable components can comprise a feedback component configured to communicate a portion of channel state information as feedback in a MIMO channel to achieve interference alignment. A decorrelator component can be configured to decode a signal in a data stream as a function of the portion of channel state information.

According to another aspect, a method comprises selecting, by a device comprising a processor, a portion of channel state information from among an aggregate of channel state information in a multi input multi output channel. The device communicates feedback that comprises the portion of channel state information for interference alignment of a number of data streams in the MIMO channel. The method further comprises decoding, by the device, a signal in a data stream of the number of data streams as a function of the portion of channel state information.

The following description and the annexed drawings set forth in detail certain illustrative aspects of the disclosed subject matter. These aspects are indicative, however, of but a few of the various ways in which the principles of the various embodiments can be employed. The disclosed subject matter is intended to include all such aspects and their equivalents. Other advantages and distinctive features of the disclosed subject matter will become apparent from the following detailed description of the various embodiments when considered in conjunction with the drawings.

BRIEF DESCRIPTION OF THE DRAWINGS

Non-limiting and non-exhaustive embodiments of the subject disclosure are described with reference to the following figures, wherein like reference numerals refer to like parts throughout the various views unless otherwise specified.

DETAILED DESCRIPTION

Figure 1:
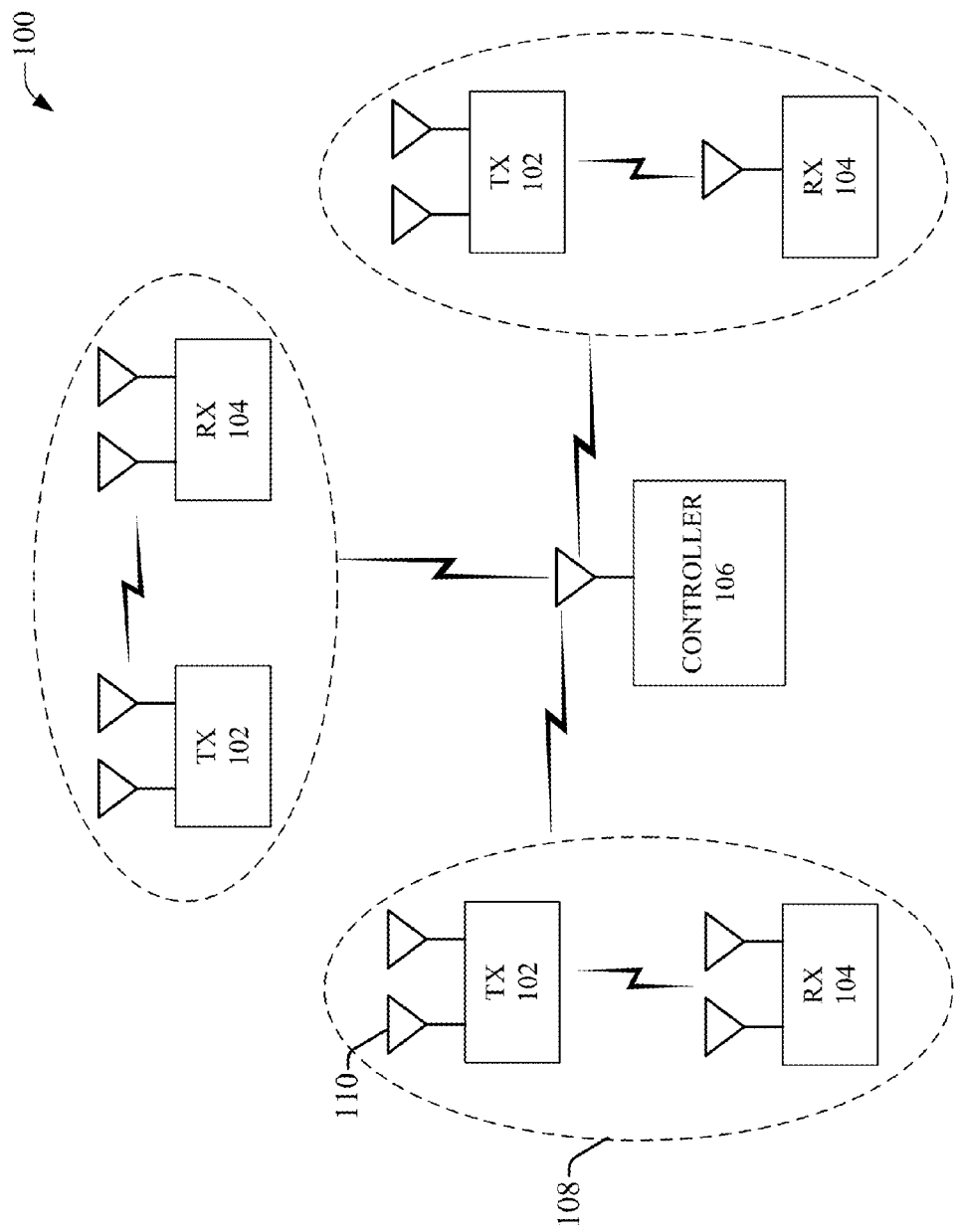
FIG. 1 illustrates a distributed wireless network 100, in accordance with an embodiment.

In the following description, numerous specific details are set forth to provide a thorough understanding of the embodiments. One skilled in the relevant art will recognize, however, that the techniques described herein can be practiced without one or more of the specific details, or with other methods, components, materials, etc. In other instances, well-known structures, materials, or operations are not shown or described in detail to avoid obscuring certain aspects.

Reference throughout this specification to "one embodiment," or "an embodiment," means that a particular feature, structure, or characteristic described in connection with the embodiment is included in at least one embodiment. Thus, the appearances of the phrase "in one embodiment," or "in an embodiment," in various places throughout this specification are not necessarily all referring to the same embodiment. Furthermore, the particular features, structures, or characteristics can be combined in any suitable manner in one or more embodiments.

As utilized herein, terms "component," "system," "interface," and the like are intended to refer to a computer-related entity, hardware, software (e.g., in execution), and/or firmware. For example, a component can be a processor, a process running on a processor, an object, an executable, a program, a storage device, and/or a computer. By way of illustration, an application running on a server and the server can be a component. One or more components can reside within a process, and a component can be localized on one computer and/or distributed between two or more computers.

Further, these components can execute from various computer readable media having various data structures stored thereon. The components can communicate via local and/or remote processes such as in accordance with a signal having one or more data packets (e.g., data from one component interacting with another component in a local system, distributed system, and/or across a network, e.g., the Internet, a local area network, a wide area network, etc. with other systems via the signal).

As another example, a component can be an apparatus with specific functionality provided by mechanical parts operated by electric or electronic circuitry; the electric or electronic circuitry can be operated by a software application or a firmware application executed by one or more processors; the one or more processors can be internal or external to the apparatus and can execute at least a part of the software or firmware application. As yet another example, a component can be an apparatus that provides specific functionality through electronic components without mechanical parts; the electronic components can include one or more processors therein to execute software and/or firmware that confer(s), at least in part, the functionality of the electronic components. In an aspect, a component can emulate an electronic component via a virtual machine, e.g., within a cloud computing system.

The word "exemplary" and/or "demonstrative" is used herein to mean serving as an example, instance, or illustration. For the avoidance of doubt, the subject matter disclosed herein is not limited by such examples. In addition, any aspect or design described herein as "exemplary" and/or "demonstrative" is not necessarily to be construed as preferred or advantageous over other aspects or designs, nor is it meant to preclude equivalent exemplary structures and techniques known to those of ordinary skill in the art. Furthermore, to the extent that the terms "includes," "has," "contains," and other similar words are used in either the detailed description or the claims, such terms are intended to be inclusive—in a manner similar to the term "comprising" as an open transition word—without precluding any additional or other elements.

Artificial intelligence based systems, e.g., utilizing explicitly and/or implicitly trained classifiers, can be employed in connection with performing inference and/or probabilistic determinations and/or statistical-based determinations as in accordance with one or more aspects of the disclosed subject matter as described herein. For example, an artificial intelligence system can be used, by channel state monitoring component to interpret partially connected channel states and factors contributing thereto.

In addition, the disclosed subject matter can be implemented as a method, apparatus, or article of manufacture using standard programming and/or engineering techniques to produce software, firmware, hardware, or any combination thereof to control a computer to implement the disclosed subject matter. The term "article of manufacture" as used herein is intended to encompass a computer program accessible from any computer-readable device, computer-readable carrier, or computer-readable media. For example, a computer-readable medium, such as non-transitory or tangible computer-readable media, can include, but is not limited to, a magnetic storage device, e.g., hard disk; floppy disk; magnetic strip(s); an optical disk (e.g., compact disk (CD), a digital video disc (DVD), a Blu-ray Disc™ (BD)); a smart card; a flash memory device (e.g., card, stick, key drive); and/or a virtual device that emulates a storage device and/or any of the above computer-readable media.

Overview

As mentioned in the background, current IA techniques have room for improvement. In this regard, using infinite dimension extension on the time dimension (time selective fading), it has been shown that the IA can facilitate determination of Degrees-of-Freedom (DoFs) of $$\frac{KN}{2}$$

in K-pair MIMO ergodic interference channels with N antennas at each node. As further mentioned, one challenge of IA schemes that remains is the feasibility condition. For instance, a conventional IA scheme uses $O((KN)^{2K^2N^2})$ dimensions of signal space to achieve $$\frac{KN}{2}$$

of the total DoFs.

To avoid such relatively large dimensions of signal space, some researchers have studied IA designs for quasi-static (or constant) MIMO interference channels. With limited signal space dimensions, the achievable DoF of each transmitter-receiver pair in MIMO interference channels has been upper bounded by $$\frac{N_t N_r}{K+1}$$

(where K is the number of transmitter-receiver pairs, $N_t$, $N_r$ are the number of antennas at each transmitter and receiver, respectively). Unlike the time-selective or frequency-selective MIMO interference channels, the total DoFs of quasi-static MIMO interference channels do not scale with K. Furthermore, it is challenging to design precoders and decorrelators (e.g., beamforming vectors and zero-forcing vectors, respectively) that satisfy the IA use conditions in limited dimension MIMO interference channels due to the feasibility issue. In fact, the technical challenges on the feasibility issue in limited dimension MIMO interference channels are highly related to full connectivity in the interference graph. However, in practice, the interference channels are usually partially connected due to path loss and shadowing, as well as spatial correlation.

In consideration of these and/or other issues regarding conventional IA approaches, various embodiments are described herein for IA as a linear precoding strategy that can achieve increased or optimal capacity scaling at high Signal-to-Noise Ratios (SNR) in interference networks. Rather than using full channel state information (CSI) at the transmitters, which induces a relatively large CSI signaling cost, embodiments disclosed herein comprise IA processes with a significantly smaller CSI feedback cost that can be based on less than the full CSI. A feedback dimension operates to quantify the CSI feedback cost. This metric serves as a first order measure of CSI feedback overhead. The proposed IA scheme includes a precoder/decorrelator structure design as well as a feedback profile design that operates to achieve a flexible tradeoff between degree of freedom (DoF) requirements for data streams, the antenna resources and the CSI feedback cost. In addition, an IA feasibility condition is devised under a CSI feedback dimension constraint.

In an aspect, components of a MIMO channel operate to select a portion of CSI from among an aggregate of CSI that is detected at a communication device of a pair of transmitters and receivers communicatively coupled to one another. A transmitter and a receiver of the pair of transmitters and receivers communicate feedback that comprises the portion of CSI selected from the aggregate of CSI for interference alignment. The feedback cost can be determined as a function of the portion of CSI, which represents a sum of dimensions of Grassmannian manifolds that comprises CSI matrices of the aggregate of CSI. Therefore, IA can be achieved with a significantly smaller CSI feedback cost in MIMO networks in accordance with further details exemplified and described below.

Non-Limiting Embodiments for CSI Feedback Reduction for MIMO Interference Alignment FIG. 1 illustrates a distributed wireless network 100, in accordance with one or more embodiments described. Aspects of one or more systems, apparatuses or processes described herein can constitute executable component(s) embodied within machine(s), e.g., embodied in one or more computer readable mediums (or media) or storage devices associated with one or more machines. Such component, when executed by the one or more machines, e.g., computer(s), computing device(s), virtual machine(s), etc. having a processor, for example, can cause the machine(s) to perform the operations described.

In one aspect, a distributed wireless network 100 is an interference network such as a MIMO network. The distributed wireless network 100 illustrated in FIG. 1 is an example architecture that can embody one or more aspects of the disclosure. Other network architectures are also envisioned such as a single transmitter and receiver, which respectively include multiple antennas for communicating in a MIMO channel, as well as other network device configurations. The wireless network 100, for example, includes a plurality of transmitters (Tx) 102, a plurality of receivers (Rx) 104 and a central controller 106. Transmitters 102 and receivers 104 can form transmitter-receiver pairs 108 that communicate directly with each other in accordance with a MIMO communications techniques. Transmitters 102 and receivers 104 can represent any type of wireless communication device, which can have both transmit and receive capabilities. The controller 106 can be a stand-alone wireless communication device configured to communicate wirelessly with transmitters 102 and receivers 104, or can be located within one of transmitters 102 or receivers 104. For, example, the transmitters 102 and receivers 104 can include base stations, access point, and/or user devices. The term node as used herein is used to refer to any apparatus which functions as a transmitter or receiver.

Although FIG. 1 depicts three transmitter (Tx) and receiver (Rx) pairs, it should be appreciated that any number of transmitter and receiver pairs can operate in network 100 in accordance with the subject disclosure. As used herein, the network 100 contitutes a MIMO system with K transmitter (Tx) and receiver (Rx) pairs. Each transmitter and each receiver can have $N_i$ and $M_i$ antennas 110, respectively. The Tx and Rx pairs can be configured to communicate via partially connected, quasi-static MIMO interference channels, for example. The term "fully-connected" refers to the condition that all channel coefficients are non-zero. In other words, all receivers see interference from all transmitters. MIMO interference channels are generally defined by channel state matrices including a number of coefficients. Fully connected interference channels have a full rank. However, MIMO interference channels are often partially connected due to path loss, shadowing, as well as partial correlation.

Due to the broadcast nature of wireless communication, interference can be one of the most serious performance bottlenecks in wireless networks. Conventional interference management schemes either treat interference as noise or use channel orthogonalization to avoid interference. However, these processes can be improved in general. Interference alignment (IA), which aligns the aggregate interference from different transmitters (Txs) into a lower dimensional subspace at each receiver (Rx), can achieve an optimal capacity scaling with respect to signal to noise ratio (SNR) with a broad range of network topologies. For instance, in a K-user MIMO interference channel with N antennas at each node, IA processing can achieve a throughput $$O\left(\frac{KN}{2}\log SNR\right).$$

This scaling law can be an advantage from conventional orthogonalization schemes (O(N·log SNR)). Classical IA designs assume that all cross link channel state information at the Tx side (CSIT) is known. In practice, it can be difficult to obtain accurate CSIT estimation due to a limited feedback capacity and the performance of IA can be sensitive to CSIT error. Thus, there is a need to reduce the CSI feedback for IA in MIMO interference networks such as in the interference network 100.

In another aspect, the controller 106 of the network 100 is configured to generate a CSI feedback scheme (independently of any quantization process or with no quantization) to reduce the CSI feedback cost in the MIMO interference network 100 under a given number of data streams requirement. Instead of CSI truncation, the controller 106 implements a more holistic set of CSI reduction strategies by selectively feeding back the essential parts of the CSI knowledge to achieve the IA interference nulling requirements for all the data streams. The controller 106, for example, can operate to determine a feedback dimension (metric) that quantifies the cost of CSI feedback in interference networks. This metric represents the sum dimension of the Grassmannian manifolds that can comprise the CSI feedback matrices and operate as a first-order measurement of the CSI feedback overhead. The controller 106 is configured to analyze and determine a dynamic feedback profile that achieves a flexible and dynamic tradeoff between the performance (e.g., DoFs) and the CSI feedback cost in the interference network 100. The DoF of wireless interference networks represents the number of interference-free signaling dimensions in the network 100. The interference processes implemented by the controller 106, for example, can reduce the feedback cost to achieve IA in interference networks by feeding back part of or a portion of the CSI according to the feedback profile.

Figure 2:
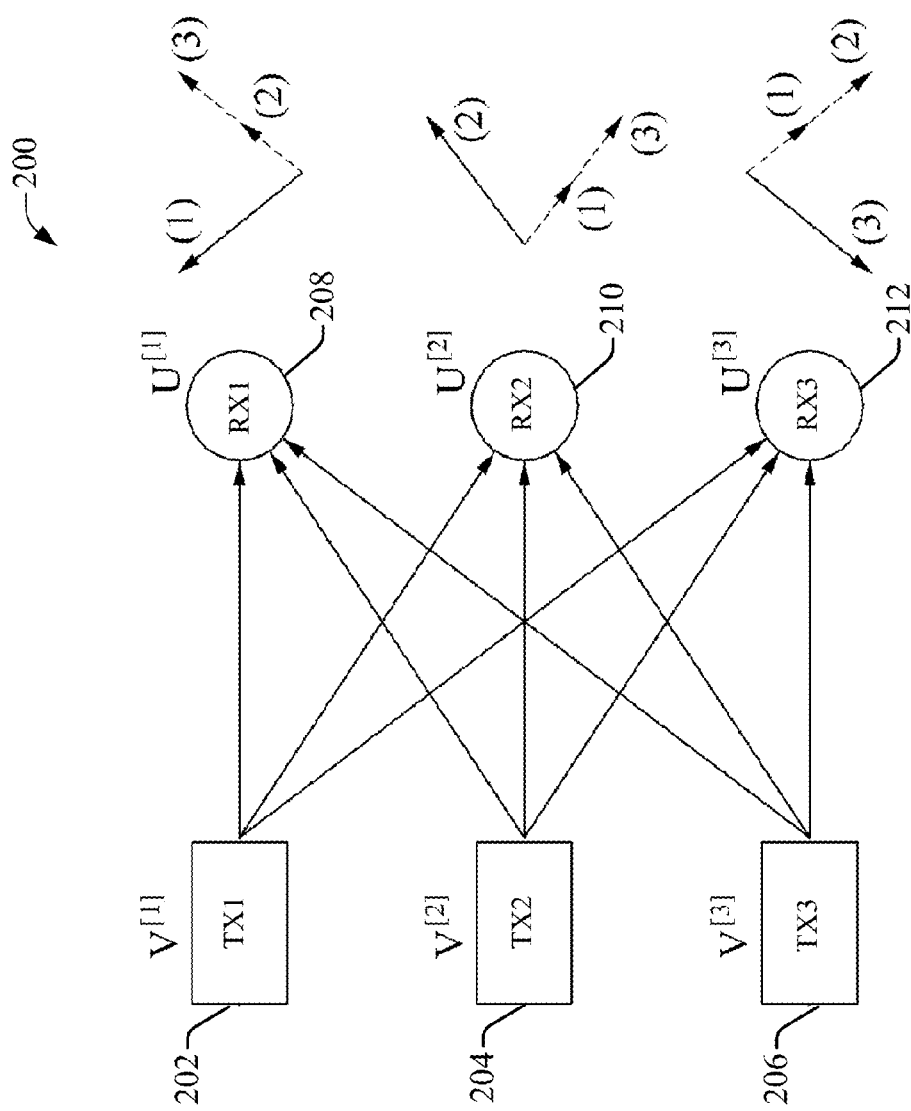
FIG. 2 illustrates an example of an interference alignment scheme in accordance with and embodiment.

FIG. 2 illustrates an example of an interference alignment scheme that can be employed in accordance with embodiments disclosed. For example, referring to FIG. 2, a MIMO communication system 200 includes transmission nodes (Tx1, Tx2, and Tx3) 202, 204, and 206. Each of the transmission nodes (Tx1, Tx2, and Tx3) 202, 204, and 206 corresponds to each of destination receiver nodes (Rx1, Rx2, and Rx3) 208, 210, and 212 respectively. It should be appreciated that three transmitters and receivers are depicted for ease of explanation. Additional K transmitter (Tx) and receiver (Rx) pairs can be employed. Each of the transmission nodes (Tx1, Tx2, and Tx3) 202, 204, and 206 denotes a data transmission device that includes, for example, a fixed base station, a mobile base station, a miniature base station such as a femto base station, a relay station, and the like. Each of the receiver nodes (Rx1, Rx2, and Rx3) 208, 210, and 212 denotes a data reception device that includes, for example, a relay station, a fixed terminal, a mobile terminal, a device such as a mobile device and the like.

When each of the transmission nodes (Tx1, Tx2, and Tx3) 202, 204, and 206 transmits data using the same MIMO channel, interference can occur in each of the receiver nodes (Rx1, Rx2, and Rx3) 208, 210, and 212. For example, in receiver node (Rx1) 208, a signal of the transmission node (Rx1) 202 corresponds to a desired signal and signals of the transmission nodes (Tx2, Tx3) 204 and 206 correspond to interference. Similarly, interference can occur even in the receiver nodes (Rx2, Rx3) 210 and 212. The above described interference can decrease a throughput of the communication system 200. The decrease in the throughput caused by the interference can be prevented or reduced by using an interference alignment scheme. For example, the transmission nodes (Tx1, Tx2, and Tx3) 202, 204, and 206 can adjust a phase of a signal reasonably designed beamforming matrices V[1], V[2], and V[3], respectively. (As used herein, the term beamforming matrix, beamforming filter, precoder, precoding matrix, and precoding filter, are used interchangeably). A signal of each of the transmission nodes (Tx1, Tx2, and Tx3) 202, 204, and 206 with the adjusted phase can be transmitted via one or more MIMO channels. A received signal of each of the receiver nodes (Rx1, Rx2, Rx3) 208, 210 and 212 can be separated into a desired signal and unwanted interference. For example, presume that arrow indicators (1), (2), and (3) of FIG. 2 denote a desired signal of the receiver nodes (Rx1, Rx2, Rx3) 208, 210 and 212 respectively. A received signal of the receiver node (Rx1) 208 can be separated into a desired signal (1) of the receiver node (Rx1) 208, and interference (2) and (3). A received signal of the receiver node (Rx2) 210 can be separated into a desired signal (2) of the receiver node (Rx2) 210, and interference (1) and (3). A received signal of the receiver node (Rx3) 212 can be separated into a desired signal (3) of the receiver node (Rx3) 212, and interference (1) and (2).

The receiver nodes (Rx1, Rx2, Rx3) 208, 210 and 212 can cancel or reduce the interference in the received signal to extract the desired signal using reasonably designed decoding matrices U[1], U[2], and U[3] via a decorrelator, respectively. (As used herein, the terms decoding matrix, decoding filter, decoder, decorrelator, and zero-forcing matrix/filter, are used interchangeably). For example, the transmission nodes (Tx1, Tx2, and Tx3) 202, 204, and 206 can use the reasonably designed beamforming matrices V[1], V[2], and V[3], respectively. The receiver nodes (Rx1, Rx2, Rx3) 208, 210 and 212 can use the reasonably designed decoding matrices U[1], U[2], and U[3], respectively. Through use of these matrices, it is possible to enhance the efficiency of the use of radio retransmissions and to prevent or reduce a decrease in throughput of the communication system caused by interference.

Although an expression of the beamforming matrices V[1], V[2], and V[3] and the decoding matrices U[1], U[2], and U[3] is used here for ease of description, the beamforming matrices V[1], V[2], and V[3] and the decoding matrices U[1], U[2], and U[3] can be in a matrix or a vector form. For example, the beamforming matrices V[1], V[2], and V[3] and the decoding matrices U[1], U[2], and U[3] can have the form of a matrix or a vector according to a number of data streams of each of the transmission nodes (Tx1, Tx2, and Tx3) 202, 204, and 206.

In one embodiment, the subject disclosure provides techniques to reduce the CSI feedback cost. For example, by communicating only part of the CSI matrices for being fed back from the Rx (Rx1, Rx2, Rx3) 208, 210 and 212 to Tx (Tx1, Tx2, and Tx3) 202, 204, and 206, the feedback cost can be reduced. A feedback profile that generates a parameterization of a feedback function can be utilized to determine which part of the CSI matrices to feedback. Further, to reduce the CSI feedback cost, only partial CSI matrices will be available at the Txs and hence, the precoders can only be a function of the partial CSI. These challenges can be overcome by the unique features of the IA precoder/decorrelator, and via tools from algebraic geometry, to reduce the CSI feedback cost without affecting a DoF performance of the network. Based on the proposed interference profile design mechanism, a closed form tradeoff can be derived that results between the number of data streams, the antenna configuration and the CSI feedback dimension in a set of symmetric MIMO interference network devices of the communication system 200.

Figure 3:
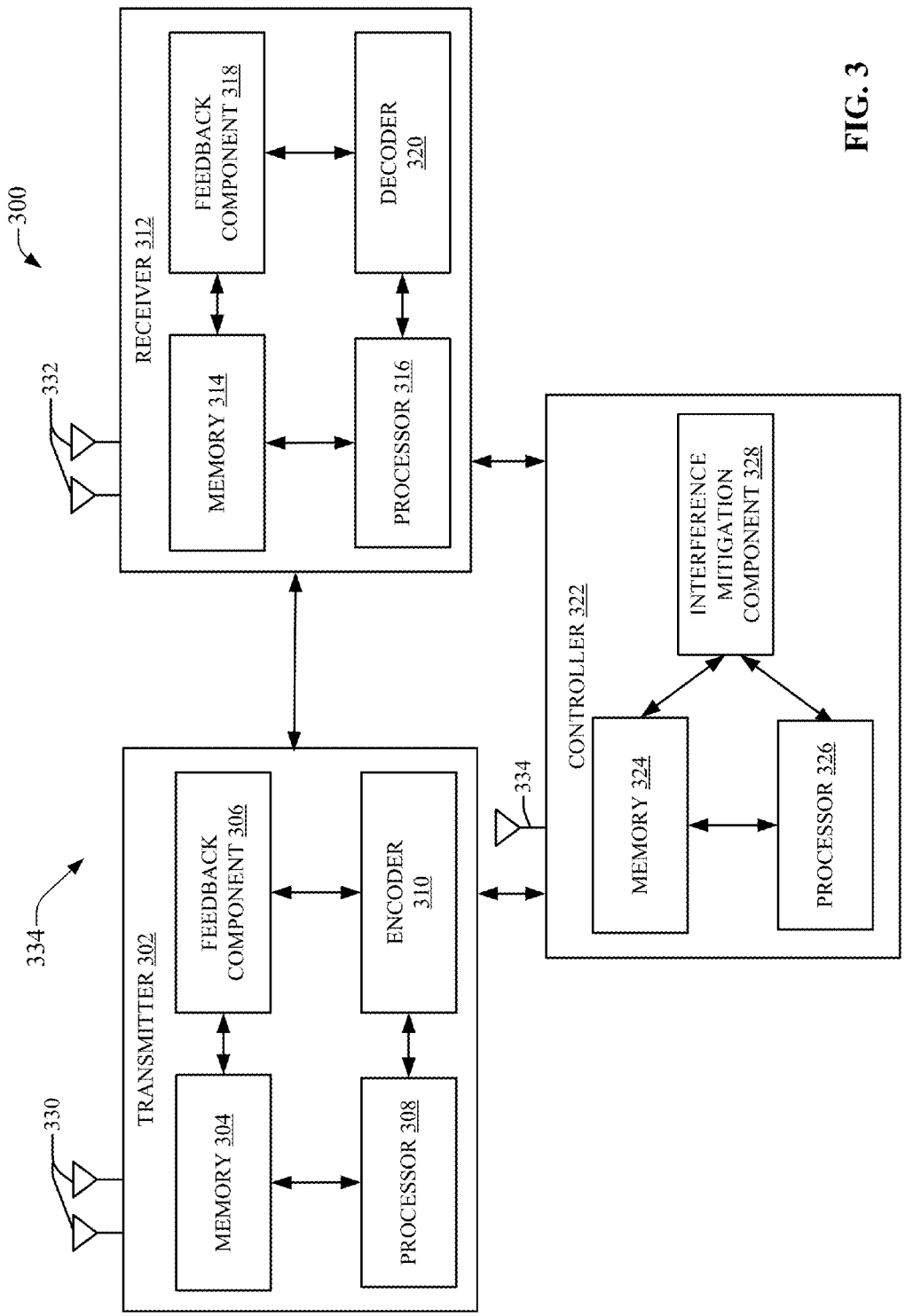
FIG. 3 presents a high level block diagram of various system elements operable in MIMO systems such as system 100 or 200 in accordance with an embodiment.

Referring to FIG. 3, illustrated is a high level block diagram of various system components (devices) operable in a MIMO communication system 300 such as systems discussed above and herein. The various system elements include a transmitter 302, a receiver 312 and a central controller 322. In an aspect, transmitter 302 and receiver 312 constitute network nodes. In distributed network embodiments, transmitter 302 can be suitable for use as one or more of transmitters 102 (FIG. 1), receiver 312 can be suitable for use as one or more of receivers 104 (FIG. 1) and the central controller 322 can be suitable for use as central scheduler to schedule communications in the network over one or more MIMO channels or antennas within the system 300. Transmitter 302, receiver 312, and central controller 322 can include mobile computing devices, or fixed computing devices capable of communicating in a MIMO network. For example, transmitter 302 and receiver 312 can include mobile user devices, access points, and/or base stations. Controller 322 can include a media access controller (MAC), or any type of remote controller or management platform capable of providing addressing and channel access control mechanisms that make it possible for network nodes, such as transmitter 302 and receiver 322, to communicate within a MIMO network. In another aspect, controller 322 can reside within a transmitter 302 or a receiver 322.

According to embodiments, MIMO communication systems of the subject disclosure, including system 300 can be configured as follows. Consider a K-user MIMO interference network where the i-th Tx and Rx, such as the transmitter 302 and the receiver 312, for example, form an i-th Tx-Rx pair 334, can be equipped with $N_i$ antennas 332 and $M_i$ antennas 330 respectively, and $d_i$ data streams are transmitted between the i-th Tx-Rx pair 334. The Tx/Rx channel fading matrix coefficients from the $Tx_i$ to the $Rx_j$ can be denoted as $H_{ji} \in \mathbb{C}^{M_j \times N_i}$. The elements of $H_{ji}$ can be independently and identically distributed Gaussian random variables with zero mean and unit variance. The CSI $\{H_{j1}, H_{j2}, \ldots, H_{jK}\}$ can be observable at the j-th Rx and the feedback from the j-th Rx can be received error-free by all the K Txs communicating in the network, such as with other Txs and Rxs discussed above.

As illustrated in FIG. 3, the transmitter 302 can include a memory 304, a processor 308, a feedback component 306, an encoder 310, and two or more antennas 330 for performing MIMO signaling protocol. Memory 304 can store instructions for carrying out the operations of the feedback component 306 and the encoder 310, when executed by processor 308. The processor 308 facilitates controlling and processing all onboard operations and functions of the transmitter 302, for example. Memory 304 interfaces to the processor 308 for storage of data and one or more applications of the transmitter. The applications can be stored in the memory 304 and/or in a firmware, and executed by the processor 308 from either or both the memory 304 or/and the firmware (not shown).

Receiver 312 can include a memory 314, a processor 316, a feedback component 318, a decoder 320, and two or more antennas 332 for performing MIMO signaling protocol. Memory 314 holds instructions for carrying out the operations of the interference mitigation component 318 and the decoder 320, when executed by processor 318. The processor facilitates controlling and processing onboard operations and functions of the receiver 312. Memory 314 interfaces to the processor 316 for storage of data and one or more applications of the transmitter 302. The applications can be stored in the memory 314 and/or in a firmware, and executed by the processor 316 from either or both the memory 314 or/and the firmware (not shown).

Controller 322 can include a memory 324, a processor 326, and an interference mitigation component 328, and at least one antenna 334 for performing MIMO signaling protocol. The controller 322 is illustrated as external to the transmitter 302 and receiver 312, but can alternatively or also be included therein as a function of or part of the feedback components 306 and 318 respectively. The controller 322 is configured to perform data stream assignment for respective transmitter and receiver pairs as determined by the interference mitigation component 328 while transmitter 302 is configured to determine and assign beamforming filters with interference mitigation component 306. The receiver 312 is configured to determine and assign zero-forcing filters with interference mitigation component 320.

It should be appreciated that various functions of the feedback components and the interference mitigation component can be employed by any of the transmitter 302, receiver 312, and controller 322. Although transmitter 302, receiver 312 and the central controller 322 are illustrated as having several separate functional elements, one or more of the functional elements can be combined and can be implemented by combinations of software-configured elements, such as processing elements including digital signal processors (DSPs), and/or other hardware elements. For example, some components can comprise one or more microprocessors, DSPs, application specific integrated circuits (ASICs), radio-frequency integrated circuits (RFICs) and combinations of various hardware and logic circuitry for performing at least the functions described herein. In some embodiments, the functional elements can refer to one or more processes operating on one or more processing elements.

Memory 324 can comprise instructions for carrying out the operations of the interference mitigation component 328 when executed by processor 326. The processor facilitates controlling and processing onboard operations and functions of the controller 322. Memory 324 interfaces to the processor 326 for storage of data and one or more applications of the transmitter. The applications can be stored in the memory 324 and/or in a firmware, and executed by the processor 326 from either or both the memory 324 or/and the firmware (not shown).

Transmitter 302 includes encoder 310 in order to precode signals with beamforming information via beamforming vectors, in accordance with interference alignment (or interference) processes that encompasses partial CSI feedback retrieved by the feedback component 306 for transmission to an associated receiver, such as receiver 312, of a transmitter-receiver pair. For example, interference alignment can include interference techniques, such as interference nulling where beamforming filters can be designed to maximize the overlap of interference signal subspaces at each receiver while ensuring that the desired signal vectors at each receiver are linearly independent of the interference subspace. Therefore, each receiver can zero-force the interference signals without zero-forcing any of the desired signals. The encoder 310 is configured to apply a beamforming filter (i.e., a beamforming matrix) determined at least as a function of the channel state information (CSI) and the feasibility of interference alignment. Receiver 312 includes decoder 320 to decode the precoded signals received from the transmitter 302 of a transmitter-receiver pair and generate decoded signals. For example, the decoder 320 is configured to apply a zero-forcing filter in order to enable the receiver to zeroforce all the interference signals without zero-forcing any of the desired signals.

In accordance with embodiments, the precoding by encoder 310 of transmitter 302 allows the decoder 320 of receiver 312 to mitigate and/or remove interference associated with transmissions of other transmitters in a MIMO network. The channel state information can represent the MIMO interference channel and/or any wireless channel between the transmitter 302 and the receiver 312 of the transmitter-receiver pair. The CSI feedback functions and the feedback dimension (metric) measuring the feedback cost can be defined according to the partial feedback received at the transmitter 302 from the receiver 312. In one embodiment, the system aims at nulling off interferences with IA between the data streams in the network based on at least a portion of the channel direction information (or channel angular information). The feedback component 306 of the transmitter 302 and the feedback component 318 of the receiver 312 can thus operate to communicate (transmit and/or receive) the channel direction information, independent of any quantization and any other channel state information. For example, for IA, if $U^\dagger HV=0$, then IP $(aH)V=0$, $\forall a \in C$. Hence, it is sufficient to only feedback the direction information of $H \in C^{N \times M}$ for IA, i.e., $\{aH: a \in C\}$, which can be a linear space contained in $G(1,M,N)$. Thus, the CSI can be restricted to the CSI feedback over the Grassmannian manifold, which is denoted as $G(A, B)$ of all A-dimensional linear subspaces in $C^{B \times 1}$. The equation $$H_j = (H_{j1}, \ldots H_{jj-1}, H_{jj+1}, \ldots H_{jk}) \in \prod_{\substack{i=1 \\ \ne j}}^{K} C^{M_j \times N-i}$$

can be the tuple of local cross-link CSI matrices observed at the j-th Rx in the MIMO interference network. Further, to reduce the CSI feedback overhead (cost), the controller 322 can operate to generate CSI filtering.

Figure 4:
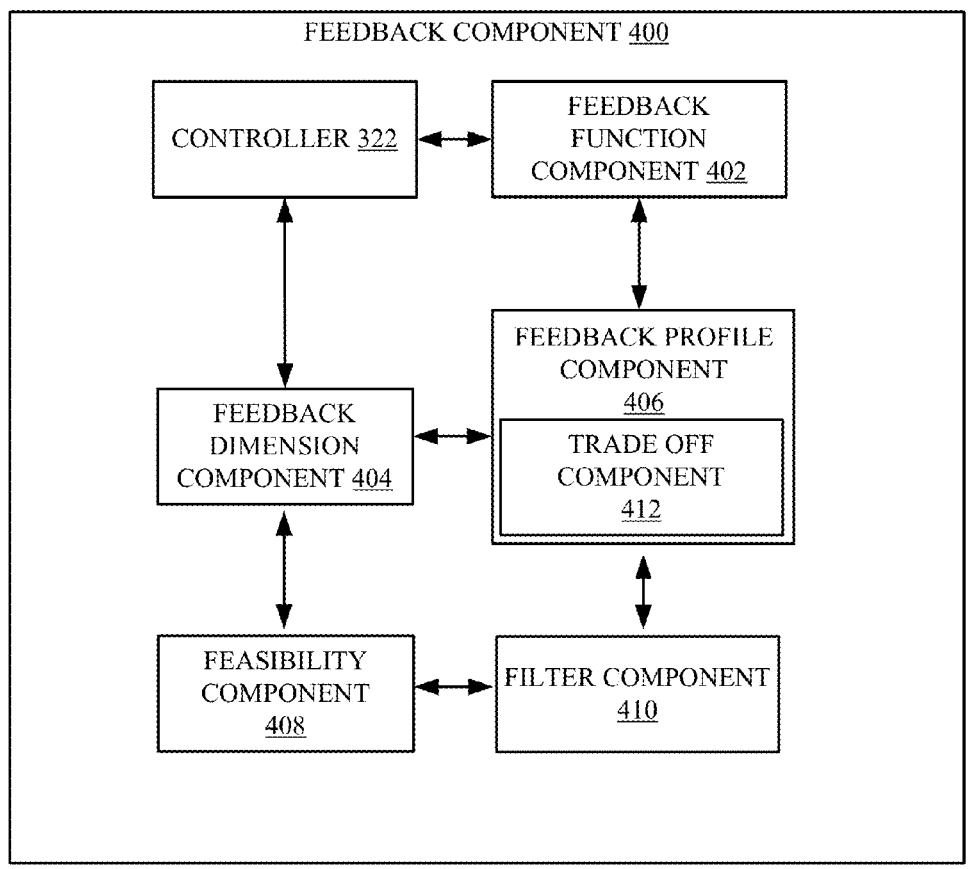
FIG. 4 presents a block diagram of a feedback component accordance with an embodiment.

Referring now to FIG. 4, presented is a block diagram of a feedback component 400. The feedback component 310 and/or 320 discussed with reference to FIG. 3 can include some or all of the components of feedback component 400. Feedback component 400 is configured to employ a mitigation scheme for a MIMO interference network. The feedback component 400 can comprise the controller 322, discussed above, a feedback function component 402, a feedback dimension component 404, a feedback profile component 408, a feasibility component 408, and a filter component 410.

The feedback component 400 is configured to communicate (transmit or retrieve) a set of partial CSI as feedback of the interference network comprising a number of data streams associated with a MIMO channel, and to facilitate interference alignment of the number of data streams in the MIMO channel with the set of partial CSI. The feedback function component 402 is configured to determine the feedback by characterizing the set of partial channel state information from an aggregate of channel state information with a feedback function. The partial CSI feedback generated by the j-th Rx is a $k_j$-tuple, which can be characterized by the feedback function component 402 as a feedback function $$F_j: \prod_{i=1 \ne j}^{K} C^{M_j \times N_i} \to \prod_{i=1}^{k_j} G(A_{ji}, B_{ji}).$$

That is:

$$H_j^{fed} = F_j(H_j), \quad (1)$$

where $k_j$ denotes the number of subspaces in $H_j^{fed}$, $H_j^{fed} \in G(A_{j1}, B_{j1}) \times G(A_{j2}, B_{j2}) \times \ldots G(A_{jk_j}, B_{jk_j})$ is the partial or portion of the CSI fed back by the j-th Rx, and $G(A_{jm}, B_{jm})$ which is the associated Grassmannian manifold with parameters $(A_{jm}, B_{jm})$ containing the m-th element in the CSI feedback tuple $H_j^{fed}$.

In other words, the outputs of the feedback function generated by the feedback function component 402 are a tuple of subspaces where each subspace corresponds to a point in the associated Grassmannian manifold. For example, the feedback component can consider two cross link CSIs $H_1, H_2 \in C^{2 \times 3}$ at a certain Rx, such as Rx1 or receiver 312. If the feedback component 318 of Rx 312 communicates feedback that comprises the null spaces of $H_1$ and $H_2$, then this corresponds to the feedback function $F = (\{v_1: H_1 v_1 = 0\}, \{v_2: H_2 v_2 = 0\}) \in G(1,3) \times G(1,3)$; If the feedback is the row space of the concatenated matrix $[H_1 \; H_2]$, this corresponds to the feedback function $F = \text{span}([H_2 H_2]^T) \in G(2, 6)$. Note under given feedback functions $\{F_j\}$, the partial CSI $\{F_j(H_j)\}$ that is fed back to the Tx 302 side for the precoder 310 can be known.

The feedback dimension component 404 is configured to determine a feedback cost of communicating the set of partial channel state information as the feedback. In other words, the feedback dimension component 404 operates to quantify the feedback cost generated from communicating the partial CSI feedback defined by the feedback function component 402 discussed above. The feedback dimension component 404 generates the quantification of feedback cost via a feedback dimension (metric), which is defined below.

The feedback dimension D can be defined as the sum of the dimension of the Grassmannian manifolds $$\{G(A_{ji}, B_{ji}): i = 1, \ldots k_j, j = 1, \ldots K\}, \text{ i.e.,} \quad (2)$$

$$D = \sum_{j=1}^{K} \sum_{i=1}^{k_j} A_{ji}(B_{ji} - A_{ji}).$$

A Grassmannian manifold of dimension D can be locally homeomorphic to $C^{D \times 1}$ and hence, the feedback dimension D denotes the number of complex scalars that can be utilized to feedback the partial CSI to the Tx side. Thus, the feedback dimension serves as a first order or primary metric of the CSI feedback overhead. For example, given B bits to feedback, a CSI contained in a Grassmannian manifold with dimension D, the CSI quantization distortion scales on $$O(2^{\frac{B}{D}}).$$

In other words, to keep a constant CSI distortion $\Delta$, the CSI feedback bits B can scale linearly with D as $$B = O\left(D \log \frac{1}{\Delta}\right).$$

Therefore, the feedback dimension disclosed can be directly proportional to the total number of bits or CSI feedback.

The feedback profile component 406 is configured to determine a feedback profile that generates a parameterization of the feedback function based on a trade-off and a reduction of a feedback cost as determined by the feedback function component 402. In one example, the feedback profile component 406 can determine the feedback profile according to a transformation invariant property, and the feedback profile is a parametrization of the feedback functions $F = \{F_1, \ldots F_K\}$ defined in (1).

Initially, the feedback feasability component 408 formally defines the IA problem described below and subject to general feedback functions F, which is essentially a feasibility problem. Thus, the feasbility component 408 operates to determine the feasibility condition that is a function of the set of partial channel state information and the number of data streams, as whether IA is feasible.

Problem 1 (IA Design with Partial CSI Feedback F) Given the feedback functions F. The IA problem is to find the set of precoders $\{V_i \in \mathbb{C}^{N_j \times d_i}: \forall i\}$ as a function of $\{F_j(H_j): \forall j\}$ and decorrelator $U_j \in \mathbb{C}^{M_j \times d_j}$ based on local CSIR (i.e., $\{H_{ji}, V_i: \forall i\}$) $\forall j$ such that $$\text{rank}(U_j^\dagger H_{jj} V_j) = d_j, \forall j, \quad (3)$$

$$U_j^\dagger H_{ji} V_i = 0, \forall i, j, i \neq j. \quad (4)$$

Compared with conventional IA problems, Problem 1 is different and difficult because it has a new constraint on the available CSI knowledge for precoder design, i.e., $\{V_i\}$ which can only be functions of the partial CSI $\{F_j\}$ that is fed back as feedback. This reflects the motivation to reduce the CSI feedback cost via the feedback dimension component 404 while maintaining the IA performance in MIMO interference networks. In conventional works of feedback designs for IA in MIMO interference network, it has been considered that the full channel direction is fed back, (i.e., $F_j(H_j) = (\ldots, \{aH_{ji}: a \in \mathbb{C}\}, \ldots)_{i \neq j})$, which corresponds to a feedback dimension of $\Sigma_{i,j:i \neq j}(M_j N_i - 1)$ in the MIMO interference networks. In the case of full channel direction feedback, the solution to Problem 1 has been widely studied, and under some sufficient conditions Problem 1 above is feasible. However, the challenge comes when the CSI direction are not fully fed back, but only partially fed back as a set of partial CSI.

Yet, for a given number of DoF requirements and antenna configurations in MIMO interference networks, the full CSI direction might not always be required while IA can still be achieved. As illustrated by three motivating examples in FIG. 5 (a)-(c), Problem 1 can still be feasible with a much smaller feedback dimension, in which denotes $N^r(\cdot)$ and $N^r(\cdot)$ as the null space and left null space respectively, i.e., $N^r(A) = \{u|Au=0\}$, $N^r(A) = \{u|u^\dagger A=0\}$.

Example 1 (CSI Feedback Design I)

Figure 5:
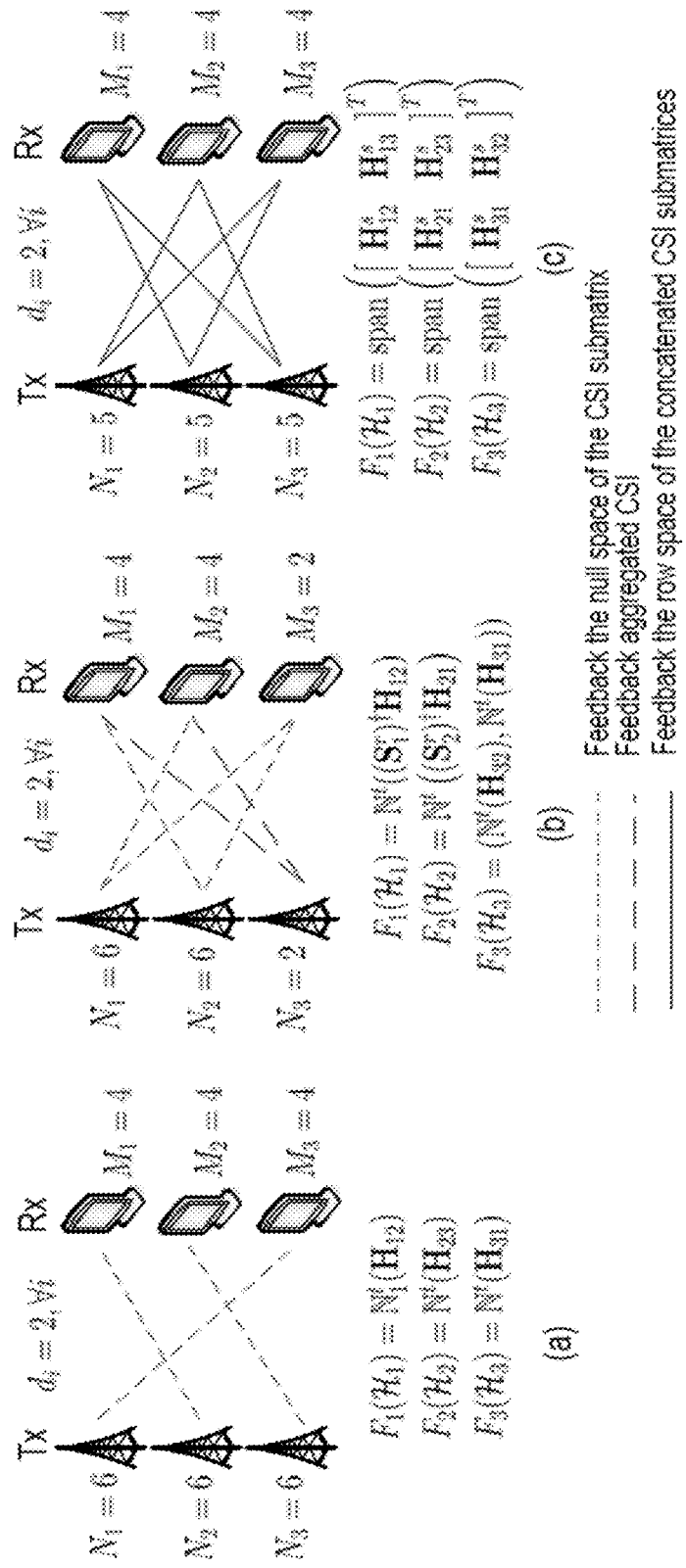
FIG. 5 presents an example of a feedback topology design in accordance with an embodiment.

A MIMO interference network is illustrated in FIG. 5 (a). The CSI feedback functions can be given by: $F_1(H_1) = N_1^r(H_{12})$, $F_2(H_2) = N^r(H_{23})$, $F_3(H_3) = N^r(H_{31})$. The precoders $V_1$, $V_2$, $V_3 \in \mathbb{C}^{6 \times 2}$ can be configured as: $\text{span}(V_1) = N_1^r(H_{31})$, $\text{span}(V_2) = N^r(H_{12})$, $\text{span}(V_3) = N^r(H_{23})$, the decorrelators, $U_1$, $U_2$, $U_3 \in \mathbb{C}^{4 \times 2}$ are configured as: $\text{span}(U_1) = N^r(H_{13} V_3)$, $\text{span}(U_2) = N^T(H_{21} V_1)$, $\text{span}(U_3) = N^r(H_{32} V_2)$. Consequently, Problem 1 has a high probability of being determined feasible via the feasility component 408, and the feedback dimension is only 24 compared with 138 under full channel direction feedback as opposed to partial channel direction feedback.

Example 2 (CSI Feedback Design II)

A MIMO interference network is also illustrated in FIG. 5 (b). The CSI feedback functions can be given by: $F_1(H_1) = N^r((S_1^r)^\dagger H_{12})$, $F_2(H_2) = N^r((S_2^r)^\dagger H_{21})$, $F_3(H_3) = (N^r(H_{32}), N^r(H_{31}))$, where $\text{span}(S_1^r) = N^r(H_{13})$ and $\text{span}(S_2^r) = N^r(H_{23})$. The precoders (encoders) (e.g., encoder 310) are configured as: $\text{span}(V_1) = N^r((S_2^r)^\dagger H_{21}) \cap N^r(H_{31})$, $\text{span}(V_2) = N^r((S_1^r)^\dagger H_{12}) \cap N^r(H_{32})$ and $V_3 = I_2$. Problem 1 has a high probability of being determined feasible, and the feedback dimension is only 32 compared with 82 under full channel direction feedback as opposed to a portion thereof.

Example 3 (CSI Feedback Design III)

A MIMO interference network is also illustrated in FIG. 5 (c). The CSI feedback functions can be given by: $F_1(H_1) = \text{span}([H_{12}^s \; H_{13}^s]^T)$, $F_2(H_2) = \text{span}([H_{21}^s \; H_{23}^s]^T)$ and $F_3(H_3) = \text{span}([H_{31}^s \; H_{32}^s]^T)$, where $H_{ji}^s = [I_4 0] H_{ji}$, $\forall j, i$. Problem 1 is also almost surely determined feasible via the feasibility component 408, and the feedback dimension is only 48 compared with 114 under full channel direction feedback.

TABLE 1

Example of feedback topology design

| | Feedback Dimension | | |
|---|---|---|---|
| | In FIG. 5(a) | In FIG. 5(b) | In FIG. 5(c) |
| Full Channel Direction Feedback | 138 | 82 | 114 |
| Proposed Feedback Schemes | 24 | 32 | 48 |

In the above three examples, Problem 1 is determined feasible even if the total feedback dimension are 24, 32 and 48 respectively. This represents an 83, 69 and 58% reduction in the feedback cost as determined by the feedback dimension component 404 for a portion of direction feedback compared with full channel direction feedback. The following four determinations can be made from the above three examples on how to reduce the feedback dimension at each Rx:

1. Strategy I (No Feedback for a Subset of Cross Links): In practice, IA can be achieved with no feedback for a subset of the cross links. For instance, in Example 1, cross links $H_{13}$, $H_{21}$ and $H_{32}$ are not fed back at all. With this strategy, Problem 1 is still feasible and the feedback dimension can be significantly reduced.

2. Strategy II (Feedback of Aggregate CSI for a Subset of Cross Links): In practice, IA can be achieved by feeding back the aggregate CSI for a subset of cross links, or less than all of a set of cross links. For example, in Example 2, link $H_{13}$ can be canceled by designing the decorrelator of Rx 1 in the space of $N^r(H_{13})$. Hence, the feedback information for that link is $S_1^r$ ($\text{span}(S_1^r) = N^r(H_{13})$), which is aggregated in the feedback CSI of the other subsets of cross links (e.g., the CSI feedback for the link from Tx 2 to Rx 1 has the form $(S_1^r)^\dagger H_{12}$). With this strategy, Problem 1 is still feasible and the feedback dimension or cost is reduced.

3. Strategy III (Feedback of Null Space of CSI Submatrix for a Subset of Cross Links): In practice, IA can be achieved by feeding back the null spaces for a subset of cross links. This is because the Tx can design the precoder 310 in a channel null space to cancel that link. For example, in Example 2, only the null spaces of $(S_1^r)^\dagger H_{12}$ are fed back at Rx 1. With this strategy, Problem 1 is still feasible and the feedback dimension is reduced.

4. Strategy IV (Feedback of Row Space of CSI Submatrices for a Subset of Cross Links): In practice, IA can be achieved by feeding back the row space of the concatenated CSI submatrices for a subset of cross links. For example, in Example 3, only $\text{span}([H_{12} \; H_{13}^s]^T)$ is fed back at Rx 1. With this strategy, Problem 1 is still feasible and the feedback dimension is reduced.

Note that it is possible to use only one of the above strategies or apply them together and how to use these strategies depends on the DoF requirements and the antenna configurations. Furthermore, different combinations of these strategies could have a significantly different IA feasibility result and final feedback cost. To begin with, some structure forms for the feedback functions that can embrace all these 4 strategies can be determined by the feedback profile component 406. Based on the above insights, the feedback component 400 can operate to partition the cross links seen by the j-th Rx into four subsets as defined below.

Definition 3 (Partitioning of Cross Links) The set of cross links seen by the j-th Rx, for example, can be partitioned into four subsets, namely, $\Omega_j^I$, $\Omega_j^{II}$, $\Omega_j^{III}$ and $\Omega_j^{IV}$, according to the four strategies illustrated and discussed above. Note that $$\bigcup_{m=\{I,II,III,IV\}} \Omega_j^m = \{1, \ldots j-1, j+1, \ldots K\},$$

$$\Omega_j^m \cap \Omega_j^n = \emptyset, \forall m \neq n, m, n \in \{I, II, III, IV\}.$$

Figure 6:
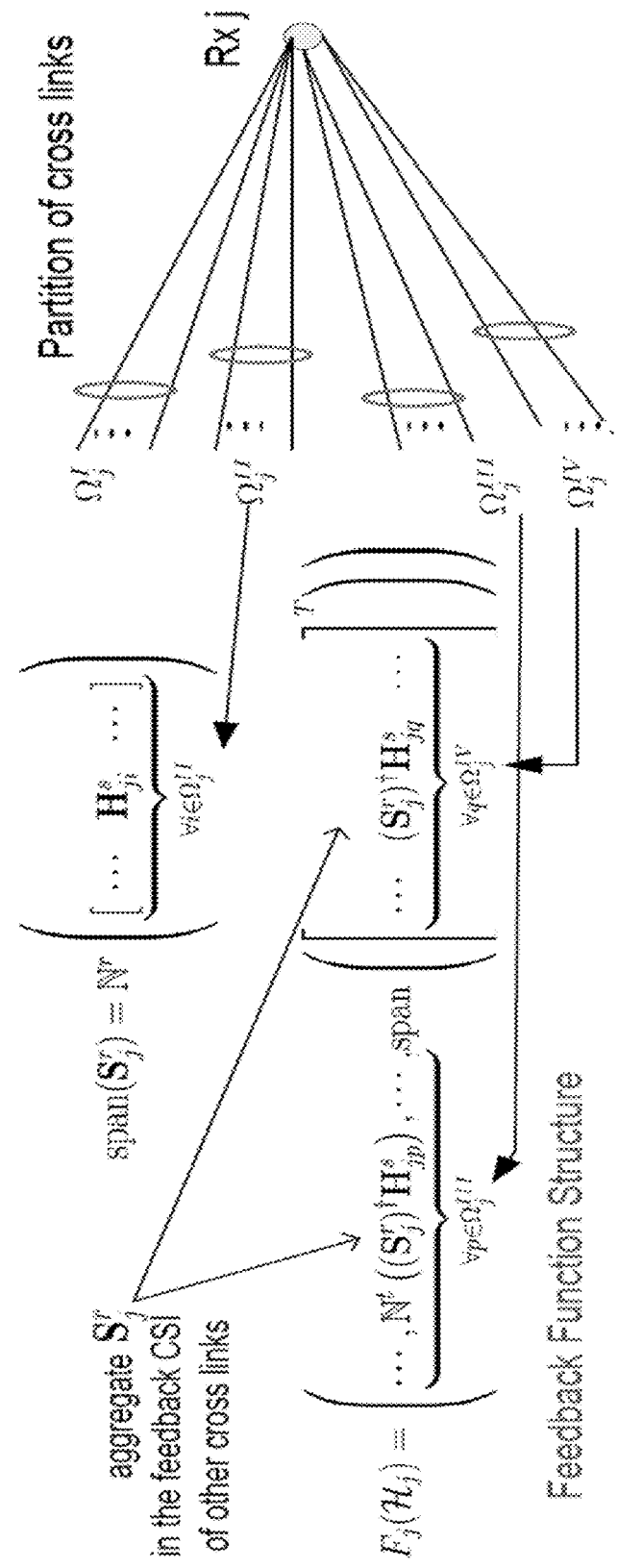
FIG. 6 illustrates an example of a feedback function structure in accordance with an embodiment.

Referring to FIG. 6, illustrated is a structure of the feedback function(s) F.

Assumption 2 (Structure of Feedback Functions F) The feedback functions $F_j$ in (1) for the MIMO interference networks can have the following structure:

$$F_j(H_j) = \left( \ldots, N^t((S_j^r)^\dagger H_{jp}^s), \ldots, \text{span}\left( \left[ \ldots \frac{(S_j^r)^\dagger H_{jq}^s \ldots}{\forall q \in \Omega_j^{IV}} \right]^T \right) \right), \quad (5)$$

$$\underbrace{\phantom{\ldots}}_{\forall p \in \Omega_j^{III}}$$

where $S_j^r \in \mathbb{C}^{M_j^s \times M_j^e}$, $(S_j^r)^\dagger S_j^r = I_{M_j^e}$, $$\text{span}(S_j^r) = N^r \left( [\ldots H_{ji}^s \ldots]_{\forall i \in \Omega_j^{II}} \right), \quad (6)$$

$$M_j^e = M_j^s - \sum_{i \in \Omega_j^{II}} N_i^s, \forall j. \quad (7)$$

$$H_{ji}^s = [I_{M_j^s} \ 0] H_{ji} \begin{bmatrix} I_{N_i^s} \\ 0 \end{bmatrix}, \forall j, i. \quad (8)$$

and $\{M_i^s, N_i^s\}$ are parameters that characterize the feedback functions F.

Note in the feedback function structure illustrated that the length of the tuple $H_j^{fed}$ is $k_j = |\Omega_j^{III}| + 1$. Denote $\Omega_j^{III} @ \{p_1, \ldots, p_i, \ldots\}$, then $N^t((S_j^r)^\dagger H_{jp_i}) \in G(A_{ji}, B_{ji})$, where $A_{ji} = M_j^e$, $B_{ji} = N_{p_i}^s$, $1 \leq i \leq |\Omega_j^{III}|$ and $$\text{span}\left( [\cdots (S_j^r)^\dagger H_{jq}^s \cdots]_{\forall q \in \Omega_j^{IV}}^T \right) \in G(A_{jk_j}, B_{jk_j}),$$

where $$A_{jk_j} = \min\left(M_j^e, \sum_{v \in \Omega_j^{IV}} N_v^s\right), B_{jk_j} = \sum_{v \in \Omega_j^{IV}} N_v^s,$$

as in (1).

Note that the structural form of F in (5) embraces all four strategies of CSI feedback dimension reduction inspired by examples 1-3. Based on the structural form of F, the feedback profile component 406 can define the notion of the feedback profile of F, which gives a parametrization of F.

Definition 4 (Feedback Profile of F) Define the feedback profile of F as a set of parameters:

$$L = \{\{M_i^s, N_i^s : \forall i\}, \{\Omega_j^I, \Omega_j^{II}, \Omega_j^{III}, \Omega_j^{IV} : \forall j\}\}. \quad (9)$$

Note that $\{M_j^s, N_j^s\}$ can control the size of the CSI submatrices to be fed back and $\{\Omega_j^m : m \in \{I,II,III,IV\}\}$ defines the partitioning of the cross links with respect to the four feedback strategies at the j-th Rx. In fact, there can be a 1-1 correspondence between the feedback profile L and the feedback function in (5). For a given feedback profile L (or feedback function F), the total feedback dimension can be given by, $$D(L) = \sum_{j=1}^{K} M_j^e \left( \sum_{i \in \Omega_j^{IV}} N_i^s - M_j^e \right)^+ + \sum_{j=1}^{K} \sum_{i \in \Omega_j^{III}} M_j^e (N_i^s - M_j^e). \quad (10)$$

In fact, the CSI feedback function in (6) and the associated feedback profile in (9) can cover a lot of existing CSI feedback designs, in which only a few are mentioned below in the special cases.

Special case I (Feedback Truncated CSI): A truncated CSI feedback scheme can be implemented for the feedback component 400 in a MIMO interference network. The feedback scheme corresponds to the feedback profile $L: M_i^s = M_i$, $N_i^s = N_i$, $\Omega_j^I = \Omega_j^{II} = \Omega_j^{III} = \emptyset$, $\Omega_j^{IV} = \{1, \ldots, j-1, j+1, \ldots K\}$, $\forall j$, and feedback function $F_j = \text{span}([\ldots H_{ji} \ldots]_{i:i \neq j}^T)$, $\forall j$.

Special case II (Two-hop Centralized CSI Feedback): A centralized two-hop feedback scheme can be implemented for the feedback component 400 based on the closed form solutions of IA in MIMO interference network. The feedback scheme corresponds to the feedback profile $L: M_i^s = M_i$, $N = N_i$, $\Omega_j^{II} = \Omega_j^{III} = \emptyset$, $\Omega_j^{IV} = \{a_j, b_j\}$, $\Omega_j^I = \{1, \ldots, j-1, j+1, \ldots K\}/\Omega_j^{IV}$, $\forall j$, where $(a_1, b_1) = (2,3)$, $(a_2, b_2) = (3,4), \ldots (a_{K-1}, b_{K-1}) = (K,1)$, $(a_K, b_K) = (1,2)$, and the feedback function $F_j = \text{span}([H_{ja_j} \ H_{jb_j}]^T) = \text{span}([H_{jb_j}^{-1} H_{ja_j} \ I]^T)$, $\forall j$.

Filter component 410 can be configured to employ the stream assignments and the subspace restrictions, and design the appropriate beamforming filters (precoders) and zero-forcing filters (decorrelators) for each Tx-Rx pair.

One unique challenge of the IA precoders/decorrelators design in Problem 1 is that the precoders (e.g., precoder 310 of FIG. 3) can only be adaptive to the partial CSI knowledge at the Txs, such as transmitter 302. This is fundamentally different from conventional IA precoders/decorrelators design in which both can be adaptive to the entire CSI matrices. To address this challenge, some structure is imposed in the precoders/decorrelators so as to utilize the partial CSI obtained from combinations of feedback strategies I-IV, in which strategy I does not feedback the CSI for the chosen subset of cross links.

Utilization of Partial CSI from Feedback Strategy II: From feedback strategy II, the precoder 310 can obtain the aggregated CSI with $S_j^r$, which spans $$N^r \left( [\cdots H_{ji}^s \cdots]_{\forall i \in \Omega_j^{II}} \right).$$

Hence, the decorrelator of Rx j can be designed in the space of span($S_j^r$), and consequently, all interference from Tx i to Rx j, where $i \in \Omega_j^{II}$, is eliminated (note $(S_j^r)^\dagger H_{ji}^s = 0$, $\forall j, i \in \Omega_j^{II}$).

Utilization of Partial CSI from Feedback Strategy III: From feedback strategy III, the following set of spaces $\{N^t((S_j^r)^\dagger H_{ji}^s): \forall j, i \in \Omega_j^{III}\}$ can be obtained. Based on this information, the set of matrices $$\{S_i^t \in C^{N_i^s \times N_i^e} : \forall i\}$$

can be obtained, where $(S_i^t)^\dagger S_i^t = I_{N_i^e}$, $$\text{span}(S_i^t) = \bigcap_{\forall j, i \in \Omega_j^{III}} N^t((S_j^r)^\dagger H_{ji}^s) \tag{11}$$

and $$N_i^e = N_i^s - \sum_{j: i \in \Omega_j^{III}} M_j^e, \forall i. \tag{12}$$

Hence, the precoder of Tx i can be implemented in the space of span($S_i^t$), and consequently, all the interference from Tx i to Rx j, where $i \in \Omega_j^{III}$, is eliminated (note $(S_j^r)^\dagger H_{ji}^s S_i^t = 0, \forall j, i \in \Omega_j^{III}$).

Utilization of Partial CSI from Feedback Strategy IV: From feedback strategy IV, the following set of spaces, i.e., span $$\left\{\text{span}\left([\cdots (S_j^r)^\dagger H_{ji}^s \cdots]_{i \in \Omega_j^{IV}}^T\right) : \forall j\right\}$$

can be obtained. Based on this information, a set of matrices $\{\tilde{H}_j: \forall j\}$ can be determined, where $$\text{span}(\tilde{H}_j^T) = \text{span}\left([\cdots (S_j^r)^\dagger H_{ji}^s \cdots]_{i \in \Omega_j^{IV}}^T\right),$$

and there exist an invertible matrix $R_j \in C^{M_j^e \times M_j^e}$ such that $$\tilde{H}_j = R_j[\cdots (S_j^r)^\dagger H_{ji}^s \cdots]_{i \in \Omega_j^{IV}} \tag{13}$$

Hence, obtained is $\{R_j(S_j^r)^\dagger H_{ji}^s : \forall j \in \Omega_j^{IV}\}$, and the precoders/decorrelators can be designed based on these effective CSI matrices such that the interference from Tx p to Rx q, $\forall (p,q) \in \{(j,i): \forall j, i \in \Omega_j^{IV}\}$ can be aligned into a lower dimensional subspace at the Rxs.

Based on these insights, the following structures can be utilized for $\{V_i, U_j\}$ in the MIMO interference networks.

Definition 5 (IA Precoders/Decorrelators Structure) The IA solutions $\{V_i, U_j\}$ for Problem 1 have the following structure:

$$V_i = \begin{bmatrix} S_i^t V_i^a \\ 0 \end{bmatrix}, U_j = \begin{bmatrix} S_j^r(R_j)^\dagger U_j^a \\ 0 \end{bmatrix}, \tag{14}$$

where $V_i^a \in C^{N_i^e \times d_i}$, $U_j^a \in C^{M_j^e \times d_j}$, $M_j^e$ and $N_i^e$ are given in (7) and (12) respectively.

Note the above solution structures (14) automatically satisfy the IA constraints (4) for links from Tx i to Rx j, where $i \in \Omega_j^{II} \cup \Omega_j^{III}$, $\forall j$ and they satisfy the partial CSI feedback constraints in Problem 1. However, the constraints that $\{H_{ji}: \forall j, i \in i \in \Omega_j^I\}$ are not fed back and hence can not be utilized to design the precoders, can be difficult to apply classical algebraic geometry theory to the study of Problem 1. To cope with this, Problem 1 is transformed via the feedback component 400 to the following feasibility problem (Problem 2), in which all the hidden constraints on the available CSI knowledge are explicitly handled or considered.

Problem 2 (Transformed IA Problem) Find $V_i^a \in C^{N_i^e \times d_i}$, $\forall i$ and $U_j^b \in C^{M_j^e \times d_j^0}$ such that $\{V_i^a, U_j^b\}$ satisfy $$\text{rank}(V_i^a) = d_i, \forall i, \text{rank}(U_j^b) = d_j^0, \forall j, \tag{15}$$

$$(U_j^b)^\dagger G_{ji} V_i^a = 0, \forall j, i \in \Omega_j^{IV}, \tag{16}$$

where $G_{ji} = R_j(S_j^r)^\dagger H_{ji}^s S_i^t$, $$d_j^0 = d_j + \sum_{i \in \Omega_j^I} d_i,$$

$\forall j, i \in \Omega_j^{IV}$.

Lemma 1 (Equivalence of Problem 1 and Problem 2 under-transceiver) For a given feedback profile L, under the precoders/decorrelators structures in (14), Problem 1 is feasible if Problem 2 is feasible. Furthermore, if $\{V_i^a, U_j^b\}$ are the solution of Problem 2, then $$V_i = \begin{bmatrix} S_i^t V_i^a \\ 0 \end{bmatrix}, U_j = v_{d_j}\left(\sum_{i \neq j}(H_{ji} V_i)(H_{ji} V_i)^\dagger\right), \forall i, j \tag{17}$$

are solution of Problem 1, where $v_{(d)}(A)$ is the matrix of eigenvectors corresponding to the d least eigenvalues of a Hermitian matrix A.

Proof Please See Appendix 7.1 in Appendix section of this disclosure infra.

Note that Lemma 1 simplifies the original Problem 1 by eliminating the IA constraints on communication links from Tx i to Rx j, where $i \in \Omega_j^I \cup \Omega_j^{II} \Omega_j^{III}$, $\forall j$. Furthermore, the solutions obtained will automatically satisfy the partial CSI knowledge constraints.

In the below description, the solutions for Problem 1 are derived by solving Problem 2. Note that Problem 2 is a bi-convex problem with respect to $\{V_i^a\}$ and $\{U_j^b\}$. As a result, the feedback component 400 can apply alternating optimization techniques, such as with an optimization component (not shown) to obtain a local optimal solution. The algorithm details are outlined below:

$$\min_{\{U_j^b \in C^{M_j^e \times d_j^0} : (U_j^b)^\dagger U_j^b = I_{d_j^0}, \forall j\}} I = \sum_{j, i : i \in \Omega_j^{IV}} tr\left((U_j^b G_{ji} V_i^a)(U_j^b G_{ji} V_i^a)^\dagger\right). \tag{18}$$

$$\min_{\{V_i^a \in C^{N_i^e \times d_i} : (V_i^a)^\dagger V_i^a = I_{d_i}, \forall i\}} I = \sum_{j, i : i \in \Omega_j^{IV}} tr\left((U_j^b G_{ji} V_i^a)(U_j^b G_{ji} V_i^a)^\dagger\right). \tag{19}$$

Algorithm 1 (Iterative Precoder/Decorrelator Design):
Step 1 (Initialization): Randomly initialize $$V_i^a \in C^{N_i^e \times d_i}, U_j^b \in C^{M_j^e \times d_j^0}.$$

$\forall i$. Initialize $G_{ji} = R_j(S_j^r)^\dagger H_{ji}^s S_i^t, \forall j, i \in \Omega_j^{IV}$, where $S_i^t$ is given in (11).

Step 2 (Update $\{U_j^b\}$ by Solving (18)): Update $$U_j^b = v_{d_j^0}(E_j)$$

where $$E_j = \sum_{i:i\in\Omega_j^{IV}} (G_{ji}V_i^a)(G_{ji}V_i^a)^\dagger, \forall j.$$

Step 3 (Update $\{V_i^a\}$ by Solving (19)): Update $V_i^a = v_{d_i}(T_i)$, where $$T_i = \sum_{j:i\in\Omega_j^{IV}} (G_{ji}^\dagger U_j^b)(G_{ji}^\dagger U_j^b)^\dagger,$$

$\forall i$.

Repeat Step 2 and Step 3 until convergence. From the converged solution of $\{V_i^a, U_j^b\}$ above, we can get the overall solution $\{V_i, U_j\}$ of Problem 1 using (17).

Remark 2 (Characterization of Algorithm 1) Note Algorithm 1 can automatically adapt to the partial CSI feedback constraint in Problem 1 for a given profile L. On the other hand, Algorithm 1 converges almost surely because the total interference leakage I in (18) and (19) is non-negative and it is monotonically decreasing in the alternating updates of Step 2 and Step 3. If the total interference leakage I at the converged local optimal point is 0, then the solution is a feasible solution of Problem 1, which can be determined by the feasibility component 408.

The feedback component 400 of the Tx and/or Rx can determine the feasibility conditions of Problem 1 under a feedback profile L and the precoder/decorrelator structure in (14). Based on the feasibility conditions analyzed via the feasibility component 408, a low complexity greedy algorithm can be derived by the feedback profile component 406 for a feedback profile L for a given DoF requirements in the interference network. The derived feedback profile can achieve substantial savings in the total CSI feedback dimension required to achieve the given DoFs.

The results of the feedback profile component 406 are extended in algebraic geometry and new feasibility conditions can be established via the feasibility component 408 for IA under reduced CSI feedback dimension. The transformation invariant property regarding Problem 2 can be provided below.

Lemma 2 (Transformation Invariant Property) The invertible matrices $\{R_j\}$ do not affect the feasibility conditions of Problem 2, i.e., Problem 2 is feasible when $R_j=I$, $\forall j$ if and only if it is feasible under any invertible matrix $R_j$, $\forall j$.

Proof Please see Appendix 7.2 of Appendix section for details infra.

Remark 3 (Role of Lemma Invariant-Property) From Lemma 2, it is sufficient to feedback the row space of the concatenated CSI matrices, i.e., $$\text{span}\left([ \ldots (S_j^r)^\dagger H_{ji}^s \ldots ]_{i\in\Omega_j^{IV}}^T\right)$$

at each Rx in order to satisfy the IA constraints in (15)-(16). This is illustrated in the IV-th feedback strategy in the proposed feedback structure in (6). In general, the feedback dimension can be reduced by adopting feedback strategy IV, while the feasibility of Problem 2 is not affected (i.e., the same as feeding back $$[ \ldots (S_j^r)^\dagger H_{ji}^s \ldots ]_{i\in\Omega_j^{IV}}).$$

Since $\{R_j\}$ does not affect the feasibility problem, the feasibility conditions under $R_j=I$, $\forall j$ are investigated without loss of generality. The necessary feasibility conditions can be determined as follows.

Theorem 1 (Necessary Feasibility Conditions) Given a feedback profile L and the precoder/decorrelator structure in (14), if Problem 1 is feasible, then the following three conditions are to be satisfied: 1) $N_i^e \geq d_i$, $\forall i$; 2) $M_j^e \geq d_j^0$, $\forall j$; 3) Denote $V_i = d_i(N_i^e - d_i)$, $\forall i$, $U_j = d_j^0(M_j^e - d_j^0)$, $\forall j$; $C_{ji} = d_j^0 d_i$, and $V_i$, $U_j$ and $C_{ji}$ satisfy $$\sum_{j:(j,i)\in\Omega_{sub}} U_i + \sum_{i:(j,i)\in\Omega_{sub}} V_i \geq \sum_{j,i:(j,i)\in\Omega_{sub}} C_{ji}, \quad (20)$$

$$\forall \Omega_{sub} \subseteq \{(j,i): \forall j, i \in \Omega_j^{IV}\}.$$

Proof Please see Appendix 7.3 for details.

Next, the sufficient feasibility conditions for Problem 1 are analyzed by the feasibility component 408. To ensure that $\text{rank}(V_i^a)=d_i$ and $\text{rank}(U_j^b)=d_j^0$ in Problem 2, it is sufficient to assume that the first $d_i \times d_i$, $d_j^0 \times d_j^0$ submatrix of $V_i^a$, $U_j^b$, denoted by $V_i^{(1)}$, $U_j^{(1)}$, are invertible $\forall i, j$. Under this assumption, it is further denoted $$\tilde{V}_i \in \mathbb{C}^{(N_i^e-d_i)\times d_i}, \tilde{U}_j \in \mathbb{C}^{(M_j^e-d_j^0)\times d_j^0},$$

and the four submatrices of $G_{ji}$ in (16), i.e., $$G_{ji}^{(1)} \in \mathbb{C}^{d_j^0 \times d_i}, G_{ji}^{(2)} \in \mathbb{C}^{(M_j^e-d_j^0)\times d_i},$$

$$G_{ji}^{(3)} \in \mathbb{C}^{d_j^0 \times (N_i^e-d_i)}, G_{ji}^{(4)} \in \mathbb{C}^{(M_j^e-d_j^0)\times(N_i^e-d_i)},$$

as follows:

$$\begin{bmatrix} I_{d_i} \\ \tilde{V}_i \end{bmatrix} = V_i^a (V_i^{(1)})^{-1}, \begin{bmatrix} I_{d_j^0} \\ \tilde{U}_j \end{bmatrix}$$

$$= U_j^b (U_j^{(1)})^{-1}, G_{ji}$$

$$= \begin{bmatrix} G_{ji}^{(1)} & G_{ji}^{(3)} \\ G_{ji}^{(2)} & G_{ji}^{(4)} \end{bmatrix}.$$

Hence, equation (16) becomes $$G_{ji}^{(1)} + \tilde{U}_j^\dagger G_{ji}^{(2)} + G_{ji}^{(3)}\tilde{V}_i + \tilde{U}_j^\dagger G_{ji}^{(4)}\tilde{V}_i = 0, \forall j, i \in \Omega_j^{IV}. \quad (21)$$

Based on the equation sets in (21), the sufficient feasibility conditions can be established as follows.

Theorem 2 (Sufficient Feasibility Conditions) Given a feedback profile L and the precoder/decorrelator structure in (14), if $N_i^e \geq d_i$, $M_i^e \geq d_j^0$ $\forall i$, and the row vectors of all the matrices $\{X_{ji}: \forall j, i \in \Omega_j^{IV}\}$ are linearly independent, then Problem 1 is feasible almost surely, where $$X_{ji}\underset{d_id_j^0\times \overline{M}}{} = \begin{bmatrix} 0 & (G_{ji}^{(2)})^T \otimes I_{d_j^0} & 0 & I_{d_i} \otimes G_{ji}^{(3)} & 0 \\ & d_id_j^0\times m_{ji} & d_id_j^0\times n_{ji} & & d_id_j^0\times k_{ji} \end{bmatrix} \quad (22)$$

and $\overline{M}=\Sigma_{i=1}^K(d_i^0(M_i^e-d_i^0)+d_i(N_i^e-d_i))$, $m_{ji}=\Sigma_{p=1}^{j-1}d_p^0(M_p^e-d_p^0)$, $n_{ji}=\Sigma_{p=j+1}^K d_p^0(M_p^e-d_p^0)+\Sigma_{q=1}^{i-1}d_q(N_q^e-d_q)$, $k_{ji}=\Sigma_{q=i+1}^K d_q(N_q^e-d_q)$.

Moreover, under a given feedback profile L, if the matrices $\{X_{ji}\}$ under a random channel realization $\{H_{ji}:\forall j,i\}$ have linearly independent row vectors, Problem 1 is feasible for all channel realizations with a high probability.

Proof Please See Appendix 7.4.

Corollary 1 (Feasibility Conditions in Divisible Cases) When $d_i=d$, $\forall i$, and all $M_i^s$, $N_i^s$ are divisible by the data stream, i.e., $d|M_i^s$, $d|N_i^s$, $\forall i$, the three conditions in Theorem 1 are also sufficient.

Proof Please see Appendix 7.5.

Remark 4 (Backward Compatibility with Previous Results) If the row space of the concatenated channel matrices of all cross links are fed back, i.e., $M_i^s=M_i$, $N_i^s=N_i$, $\forall i$, $\Omega_j^I=\Omega_j^{II}=\Omega_j^{III}\emptyset=\Omega_j^{IV}=\{1,\ldots,j-1,j+1,\ldots K\}\forall j$, then $M_i^e=M_i$, $d_j^0=0$, $N_j^e=N_j$, $\forall i,j$, and Corollary 1 reduces to the results (Theorem 2).

The feedback profile component 406 can operate to generate the feedback profile to reduce the total CSI feedback cost (via the feedback dimension of the feedback dimension component 404) that achieves a given DoF requirement of the K data streams $\{d_1, d_2, \ldots, d_K\}$ in the MIMO interference networks. Specifically, the feedback profile component 406 can generate a feedback profile L that satisfies the following constraints:

Problem 3 (Feedback Profile Design L)

$$\bigcup_{m\in\{I,II,III,IV\}}\Omega_j^m = \{1, \ldots K\}/\{j\}, \forall j, \quad (23)$$

$$\Omega_j^m \cap \Omega_j^n = \emptyset, \forall m\neq n, \forall j, \quad (24)$$

$$N_i^e \geq d_p, M_i^e \geq d_i^0, \forall i, \quad (25)$$

$\{X_{ji}\}$ have linearly independent row vectors,
$\forall j,i\in\Omega_j^{IV}$ (26)

where $\{X_{ji}\}$ are given in Theorem 2 and $N_i^e$, $M_i^e$ and $d_i^0$ are given in (7), (12) and (15) respectively.

Note that constraints (23), (24) come from the feedback profile structure in Assumption 2, constraints (25) and (26) come from the feasibility conditions of Problem 1 (Theorem 2).

A feedback profile that satisfies the above constraints can be called a feasible feedback profile. Ideally, the feedback profile component 406 can find a feasible feedback profile L that induces a small feedback dimension. However, the design of feedback profile L is highly non-trivial due to the combinatorial nature, and doing exhaustive search has exponential complexity in $O((N)^{2K}4^{K(K-1)}(KN)^3)$ (see equation (31)). In one embodiment, the feedback profile component 406 can generate a low complexity greedy algorithm to derive a feasible feedback profile L. As described infra, the associated feedback cost is quite small compared with conventional state-of-the-art baselines.

Figure 7:
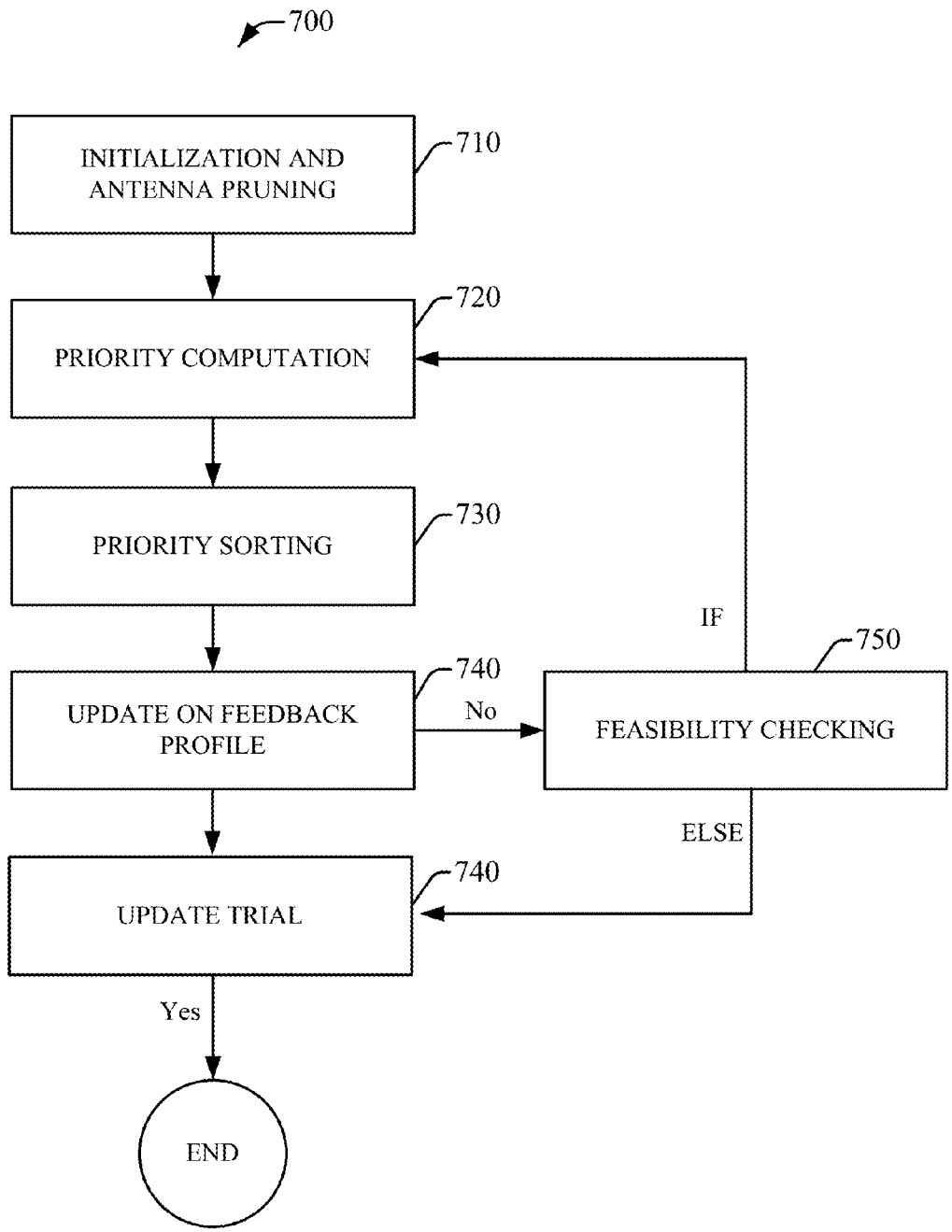
FIG. 7 illustrates a flow diagram of a greedy algorithm in accordance with an embodiment.

FIG. 7 illustrates the details of the greedy algorithm 700 and is summarized as follows:

Algorithm 2 (Greedy Feedback Profile Design L):

Step 1 (Initialization and Antenna Pruning 710): Initialize t=1, $\Omega_j^I=\Omega_j^{II}=\Omega_j^{III}=\emptyset$, $\Omega_j^{IV}=\{1,\ldots,j-1,j+1,\ldots K\}$, $\forall j$, $M_i^s=\min(M_i,\Sigma_i d_i)$, $N_i^s=\min(N_i, \Sigma_i d_i)$, $\forall i$ in L(t).

Step 2 (Priority Computation 720): Compute the priority p(s) of update strategy s on current L(t) as $$p(s) = \left(I_{\{\Delta D(s)\geq 0 \atop \Delta V(s)\leq 0\}}\Delta D(s)(-\Delta V(s)+1)\alpha + I_{\{\Delta D(s)\geq 0 \atop \Delta V(s)>0\}}\frac{\Delta D(s)}{\Delta V(s)}\right), \forall s \in P(L(t)) \quad (27)$$

where P (L(t)) is the space of the update strategies on current L(t) and is given by $$P(L(t))=\{\{S^I(j,i),S^{II}(j,i),S^{III}(j,i):\forall j,i\in\Omega_j^{IV}\}, \{S^{IV}(i),S^V(i),S^{VI}(i):\forall i\}\} \quad (28)$$

$S^I(\bullet) \ldots S^{VI}(\bullet)$ are different types of update operations described in Table 1 (note that all these update strategies could potentially reduce the feedback dimension); $I_{\{\bullet\}}$ denotes the indicator function and $\Delta D(s)$ denotes the dimension reduction via s, i.e., $$\Delta D(s)=D(L(t+1|s))-D(L(t)), \quad (29)$$

where D(L) is in (10) and L(t+1|s) is the feedback profile obtained by updating L(t) with s; $\Delta V(s)$ is the consumed free variables with strategy s, i.e., $$\Delta V(s)=V(L(t+1|s))-V(L(t)), \quad (30)$$

where $V(L)=\Sigma_j U_j+\Sigma_i V_i-\mu_{j,i:\Omega_j^{IV}=1}C_{ji}$, and $U_j$, $V_i$, $C_{ji}$ are in Theorem 1; α is chosen to be $\alpha=K(\Sigma d_i)^2$.

Step 3 (Priority Sorting 730): Sort $\{p(s):\forall s\in P(L(t))\}$ in descending order, i.e., $P(L(t))@\{s_1,\ldots s_J\}$, J=|P(L(t))| and $p(s_1)\geq p(s_2)\geq \ldots \geq p(s_J)$. Initialize the index k=1.

Step 4 (Greedy Update on L 740):

A (Update Trial and Stopping Condition 750): If $k\leq |P(L(t))|$ and $p(s_k)\geq 0$, then choose $s=s_k$ and update L as:

$$L(t) \xrightarrow{s} L(t+1|s);$$

Else, exit the algorithm.

B (Feasibility Checking 760): If L(t+1|s) is feasible by Theorem 2, then set t=t+1, L(t+1)=L(t+1|s) and go to Step 2; Else, set k=k+1 and go to Step 4 A.

TABLE 2

Description of different update strategies on L

| update strategy | update L(t) as |
|---|---|
| $S^I$ (j, i) | $\Omega_j^I = \Omega_j^I \cup \{i\}$, $\Omega_j^{IV} = \Omega_j^{IV}/\{i\}$ |
| $S^{II}$ (j, i) | $\Omega_j^{II} \Omega_j^{II}\cup\{i\}$, $\Omega_j^{IV} = \Omega_j^{IV}/\{i\}$ |
| $S^{III}$ (j, i) | $\Omega_j^{III} = \Omega_j^{III}\cup\{i\}$, $\Omega_j^{IV} = \Omega_j^{IV}/\{i\}$ |
| $S^{IV}$ (i) | $N_i^s = d_i$, $\Omega_j^{II} = \emptyset$, $\Omega_j^{III} = \Omega_j^{II}\cup\Omega_j^{IV}$ |
| $S^V$ (i) | $M_i^s = M_i^s - 1$ |
| $S^{VI}$ (i) | $N_i^s = N_i^s - 1$ |

Remark 5 (Design Motivation of Algorithm 2) Given current feedback profile L(t), different strategies in P (L(t)) in (28) have different features. For instance, they reduce the feedback dimension differently (i.e., $\Delta D(s)$) and consume different numbers of free variables (i.e., $\Delta V(s)$). Intuitively, a strategy with a larger ratio of dimension reduction versus variables consumption $$\left(\text{i.e., } \frac{\Delta D(s)}{\Delta V(s)}\right)$$

should have higher priority, as in this way, more aggregate feedback dimension reduction could be achieved. On the other hand, strategies with $\Delta D(s)>0$, $\Delta V(s)\leq 0$ are given relatively higher priority, as illustrated in (27) (due to the factor α in (27)), because these strategies reduce the feedback dimension (i.e., ΔD(s)>0) while they do not consume the free variables (i.e., ΔV(s)≤0).

Remark 6 (Complexity of Greedy Feedback Profile Design) A comparison can be made with the complexity of exhaustive search and the proposed design algorithm as follows. For simplicity, assume that $M_i=N_i=N$, ∀i. The overall complexity of exhaustive search is $$O\left(\underbrace{(N)^{2K}}_{(c_1)} \underbrace{4^{K(K-1)}}_{(c_2)} \underbrace{(KN)^3}_{(c_3)}\right) \quad (31)$$

where ($c_1$) is from the combinations of submatrix sizes, i.e., $M_i^s, N_i^s \in \{1, \ldots, N\}$, ∀i, ($c_2$) is from the combinations of cross link partitions, i.e., $i \in \Omega_j^I, \Omega_j^{II}, \Omega_j^{III}$ or $\Omega_j^{IV}$, ∀i≠j, ∀j and ($c_3$) is from the feasibility checking (See Appendix 7.7). The overall worst-case complexity of Algorithm 2 is $$O\left(\underbrace{K^2}_{(c_4)} \underbrace{(K^2 + KN)}_{(c_5)} \underbrace{(KN)^3}_{(c_6)}\right) \quad (32)$$

where ($c_4$) is from each update on L having at most 3K(K−1)+3K trials (|P(L(t))|≤3K(K−1)+3K), ($c_5$) is from there being less than K(K−1)+2KN updates on L, and ($c_6$) is from the feasibility checking (See Appendix 7.7).

In another embodiment, the feedback profile component 406 can comprise a trade off component 412 configured to a tradeoff as a function of a number of data streams, a number of antenna resources, and the feedback cost, according to a DoF requirement for the number of data streas. The tradeoff comprises a balance of factors between the DoF, antenna resource and feedback cost for MIMO interference network under the proposed feedback profile design. To obtain some simple insights, a closed form expression on the tradeoff is given for a symmetric MIMO interference network.

Theorem 3 (Performance-Cost Tradeoff on a Symmetric MIMO Interference Network) Considering a K-user MIMO interference network where $d_i=d$, $M_i=M$, $N_i=N$, ∀i and M, N, d satisfy 2|M, M≤2K+1, $$N = \frac{1}{2}KM,$$

d|M. The tradeoff between the data stream d and the feedback dimension $D_P$ is summarized below:

| Data Stream d | Feedback dimension $D_p$ | Feedback Profile L |
|---|---|---|
| $d \leq \frac{M}{K}$, d \| M | 0 | $N_i^s = d, M_i^s = M$, ∀i; $\Omega_j^I = \{1, \ldots j-1, j+1, \ldots K\}$; $\Omega_j^{II} = \Omega_j^{III} = \Omega_j^{IV} = \emptyset$, ∀j. |
| $d = \frac{M}{K-\kappa}$, $1 \leq \kappa \leq K-2$ | $((K+1)d^2 - Md) \cdot (K-1)^2$ | $N_i^s = Kd, M_i^s = M$, ∀i ∈ {1, \ldots κ+1}; $N_i^s = d, M_i^s = M-d$, ∀i ∈ {κ+2, \ldots K}; $\Omega_j^I = \Omega_j^{IV} = \emptyset$; $\Omega_j^{II} = \{κ+2, \ldots K\}/\{j\}$; $\Omega_j^{III} = \{1 \ldots κ+1\}/\{j\}$. |

Proof See Appendix 7.8.

Remark 7 (Interpretation of Theorem on-special) From the tradeoff expression between the DoF, antenna resource, and feedback cost in Theorem 3, the following insights can be obtained:

Feedback Dimension versus DoF d: Since $D_p=((K+1)d^2-Md)(K-1)^2$, $$\frac{M}{K-1} \leq d \leq \frac{M}{2},$$

d|M, we observe that given the number of antennas M, there is a quadratic increase of $D_p$ with respect to d. Hence the feedback cost tends to increase faster as d becomes larger.

Feedback Dimension versus Number of Antennas M: Since $D_p=((K+1)d^2-Md)(K-1)^2$, $$\frac{M}{K-1} \leq d \leq \frac{M}{2},$$

d|M, we observe that given a DoF requirement d, the feedback cost tends to decrease as the number of antennas M increases. This is because as M gets larger, a larger freedom for the feedback profile design can be obtained, and hence a better feedback profile could be obtained.

A comparison of the result derived in Theorem 3 can be made with a common baseline, which feedbacks the full channel direction of all the cross links in the symmetric MIMO interference network. In this baseline, the feedback function is given by $F_j(H_j)=(\ldots, \{aH_{ji}:a \in C\}, \ldots)_{\forall i \neq j}$, ∀j, and the feedback dimension is given by $$D_{full} = K(K-1)\left(\frac{1}{2}KM^2 - 1\right), 1 \leq d \leq \frac{M}{2},$$

d|M. Note that under full channel direction feedback, the maximum achievable data stream d is given by $$d = \min\left(\left\lfloor\frac{M+N}{K+1}\right\rfloor, M, N\right) = \frac{M}{2}.$$

Under the same DoF requirement d, the ratio of the feedback dimension achieved by the proposed feedback profile and the baseline is $$\frac{D_p}{D_{full}} \le \frac{d}{M}, 1 \le d \le \frac{M}{2}, d \mid M.$$

Hence, the proposed feedback profile requires a much lower feedback dimension when d=M.

FIGS. 8 to 11 illustrate the performance of the proposed feedback-saving scheme in MIMO interference networks through simulation. We consider limited feedback with Grassmannian codebooks to quantize the partial CSI $\{F_j\}$ at each Rx. The precoders/decorrelators are designed using the Algorithm 1 developed in Section III-B. We consider $10^4$ independent and identically distributed (i.i.d.) Rayleigh fading channel realizations and compare the performance of the proposed feedback scheme with the following 3 baselines.

Baseline 1 (Feedback Full CSI Direction): Rxs quantize and feedback full CSI direction of all the cross links using the Grassmannian codebooks.

Baseline 2 (Feedback Truncated CSI): Rxs first truncate the part of the concatenated CSI that does not affect classical IA feasibility [?, ?], and then quantize and feedback the truncated CSI using the Grassmannian codebooks.

Baseline 3 (Feedback Critical Amount of Truncated CSI): Rxs first select the submatrices $\{H_{ji}^s : \forall j,i, i \ne j\}$, where H $$H_{ji}^s = \begin{bmatrix} I_{M_j^s} & 0 \end{bmatrix} H_{ji} \begin{bmatrix} I_{N_i^s} \\ 0 \end{bmatrix}$$

and $\{M_i^s, N_i^s\}$ are chosen to make the network tightly IA feasible. Tightly IA feasible means that the IA feasible network would become IA infeasible if we further reduce any of $\{M_i^s, N_i^s\}$. Rxs then adopt the algorithm proposed in to quantize and feedback the submatrices $\{H_{ji}^s : \forall j,i,i \ne j\}$.

Figure 8:
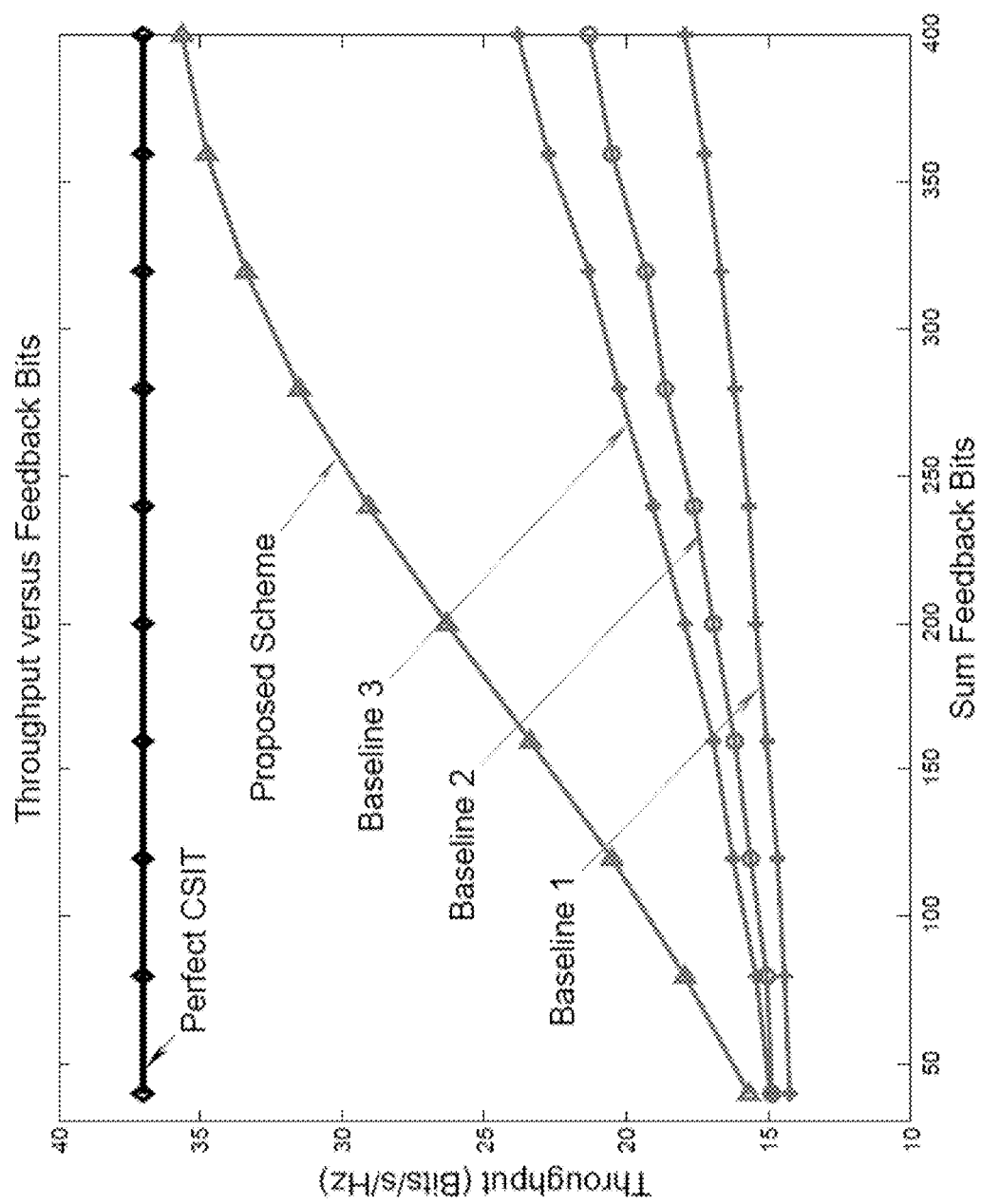
FIG. 8 illustrates a chart representing throughput versus feedback bits in accordance with embodiments described.
Figure 9:
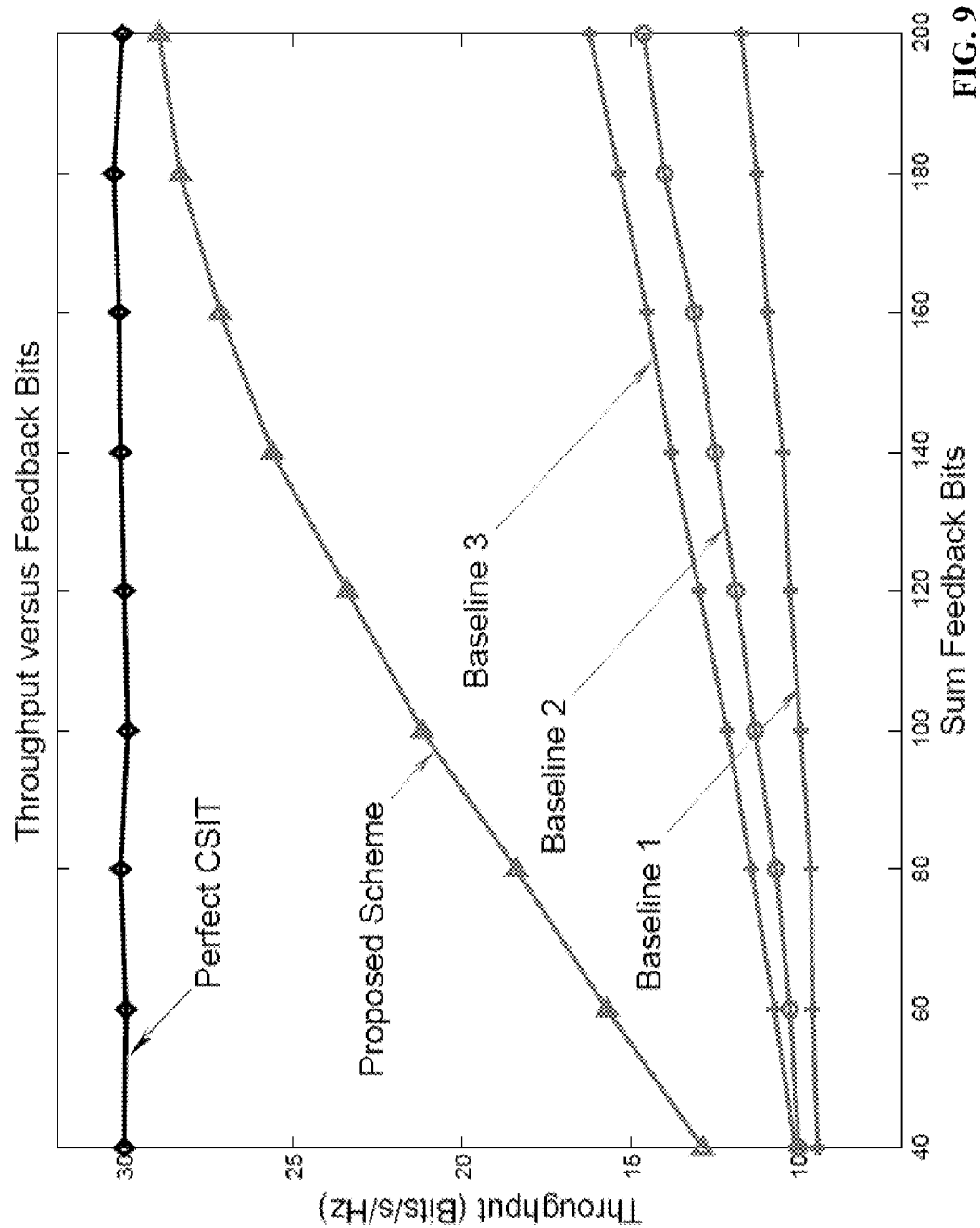
FIG. 9 illustrates a chart representing throughput versus feedback bits in accordance with embodiments described.

FIGS. 8 and 9 consider a K=4, $[N_1, \ldots, N_4]$=[5,4,4,3], $[M_1, \ldots, M_4]$=[4,3,2,4], $[d_1, \ldots, d_4]$=[2,1,1,1] MIMO interference network. The obtained sum feedback dimension for the proposed scheme, baseline 3, baseline 2 and baseline 1 are 38, 86, 111 and 144 respectively.

FIG. 8 plots the network throughput versus the sum limited feedback bits under transmit SNR 25 dB. The proposed scheme outperforms all the baselines. This is because the proposed scheme significantly reduces the CSI feedback dimension while preserving the IA feasibility, and hence more feedback bits can be utilized to reduce the quantization error per dimension. The dramatic performance gain highlights the importance of optimizing the feedback dimension in MIMO interference networks with limited feedback.

FIG. 9 illustrates throughput versus sum feedback bits under a K=4, $[N_1, \ldots N_4]$=[5,4,4,3], $[M_1, \ldots M_4]$=[4,3,2,4], $[d_1, \ldots d_4]$=[2,1,1,1] MIMO interference network and the average transmit SNR is 25 dB.

FIG. 9 illustrates the network throughput versus the transmit SNR under a total of B=400 feedback bits. The proposed scheme achieves substantial throughput gain over the baselines in a wide SNR region. The gain is larger at high SNR because residual interference, which is the major performance bottleneck in high SNR region, is significantly reduced by the proposed scheme.

Figure 10:
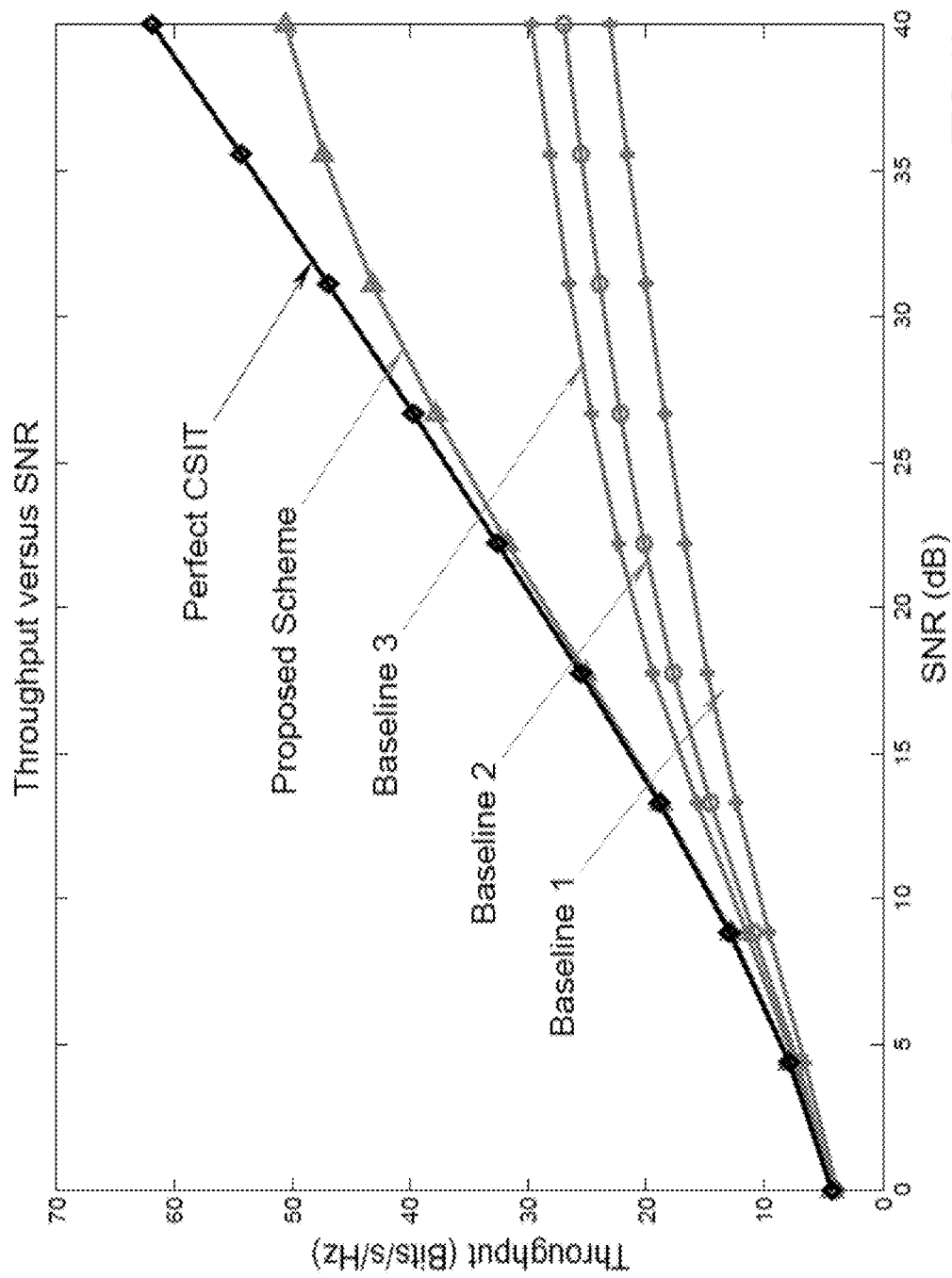
FIG. 10 illustrates a chart representing throughput versus power in accordance with embodiments described.

FIG. 10 illustrates throughput versus SNR under a K=4, $[N_1, \ldots N_4]$=[5,4,4,3], $[M_1, \ldots M_4]$=[4,3,2,4], $[d_1, \ldots d_4]$=[2,1,1,1] MIMO interference network and the sum feedback bit constraint is 400.

TABLE 3

Feedback dimension comparision

| | Obtained Feedback Dimension | |
|---|---|---|
| | FIG. 8, 9 | FIG. 10, 11 |
| Proposed Scheme | 38 | 20 |
| Baseline 3 | 86 | 56 |
| Baseline 2 | 111 | 72 |
| Baseline 1 | 144 | 96 |

Figure 11:
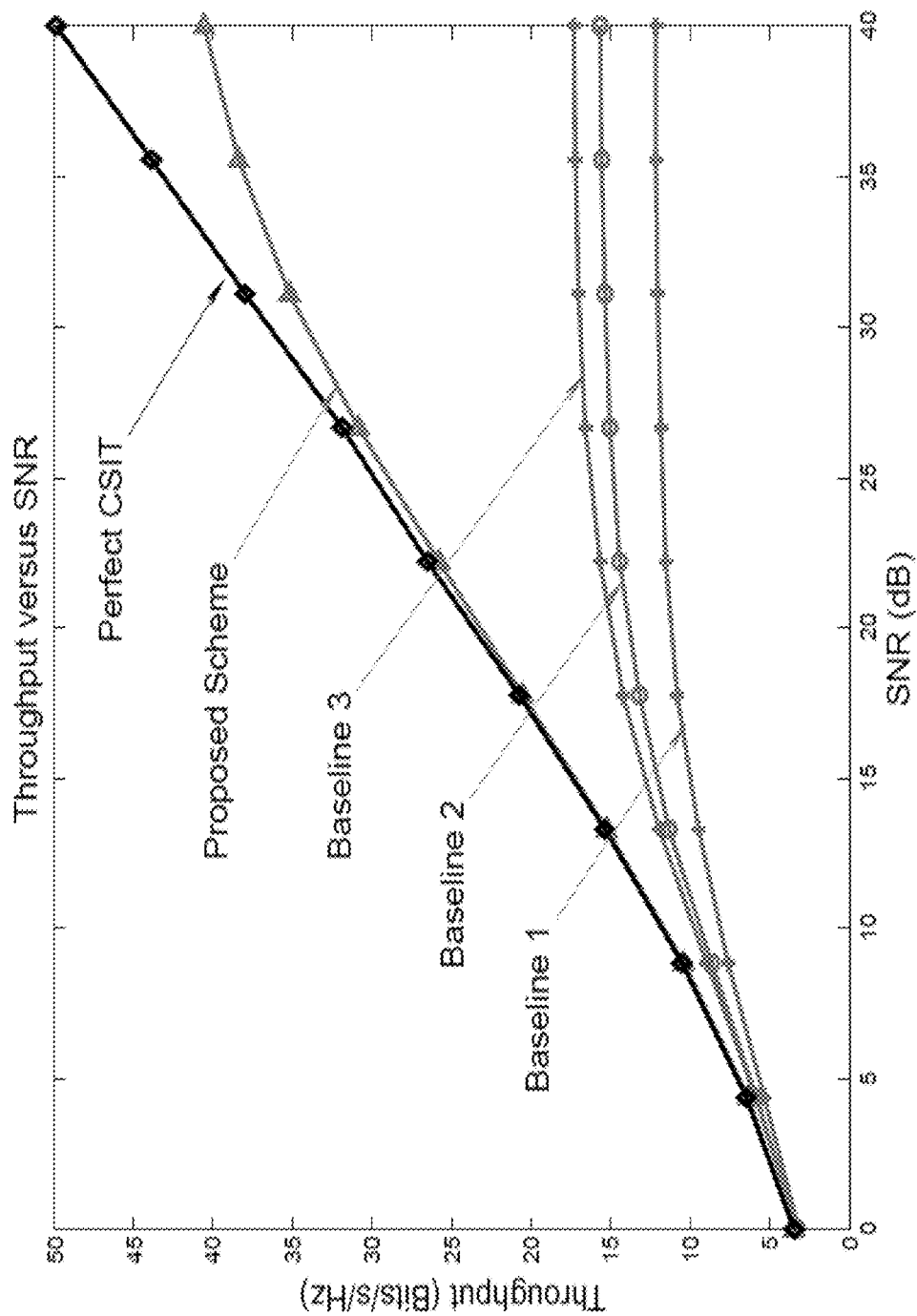
FIG. 11 illustrates a chart representing throughput versus power in accordance with embodiments described.

In FIG. 10 and FIG. 11, a K=4, $N_i=M_i=3$, $d_i=1$, $\forall i$ MIMO interference network is also simulated for performance comparison. The obtained sum feedback dimension for the proposed scheme, baseline 3, baseline 2 and baseline 1 are 20, 56, 72 and 96 respectively. FIG. 10 plots the network throughput versus the sum limited feedback bits under transmit SNR 25 dB and FIG. 11 illustrates the network throughput versus the transmit SNR under a total of B=200 feedback bits. The proposed feedback scheme also demonstrates significant performance advantages under this network topology setup.

FIG. 10 illustrates throughput versus sum feedback bits under a K=4, $N_i=M_i=3$, $d_i=1$, Vi MIMO interference network and the average transmit SNR is 25 dB.

FIG. 11 illustrates throughput versus SNR under a K=4, $N_i=M_i=3$, $d_i=1$, $\forall i$ MIMO interference network and the sum feedback bits constraint is 200.

A low complexity IA design is described above that achieves a flexible tradeoff between the DoFs and CSI feedback cost. The feedback cost is characterized by the feedback dimension. By exploiting the unique features of IA algorithms, a flexible feedback profile design is described, which enables the Rxs to substantially reduce the feedback cost by selecting the most critical part of CSI to feedback. New feasibility conditions of IA are also designed under the proposed feedback profile design. Finally, a low complexity algorithm for feedback profile design is developed to reduce feedback dimension while preserving IA feasibility. Both analytical and simulation results show that the proposed scheme can significantly reduce the CSI feedback cost of IA in MIMO interference networks.

Figure 12:
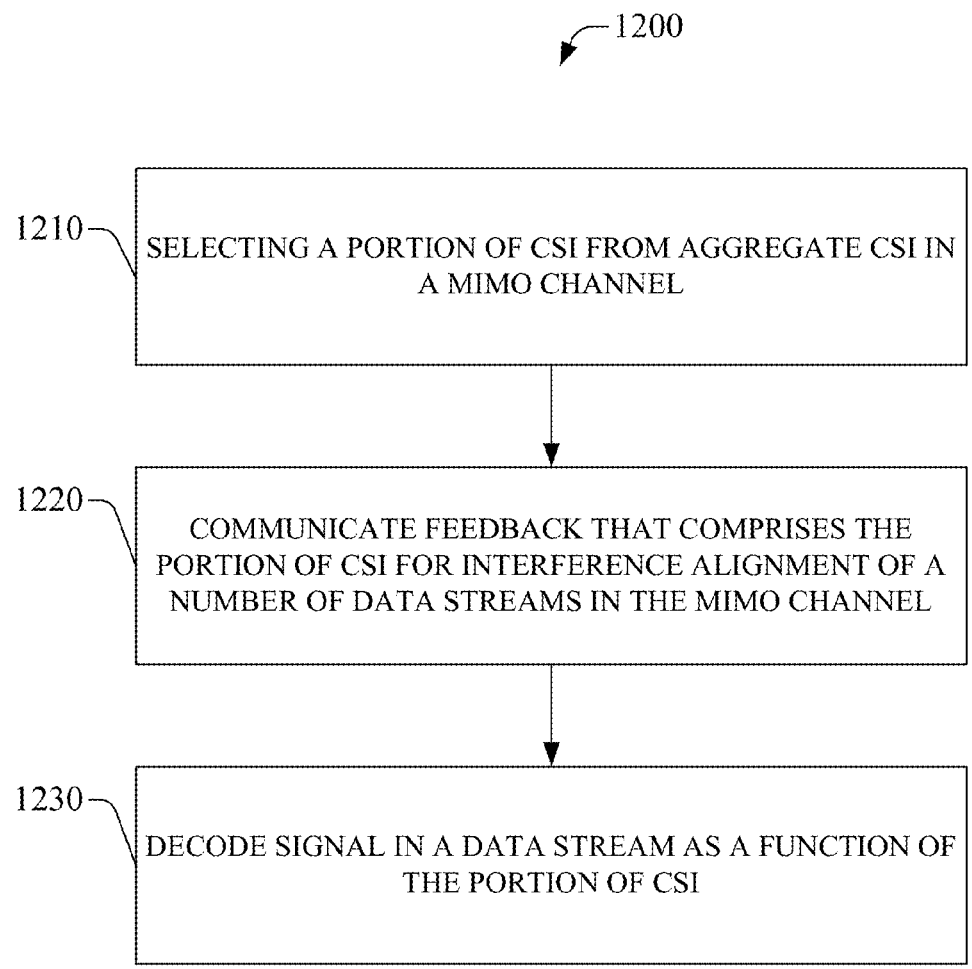
FIG. 12 presents a flow diagram of a process of interference alignment in accordance with the subject feedback processes described.
Figure 13:
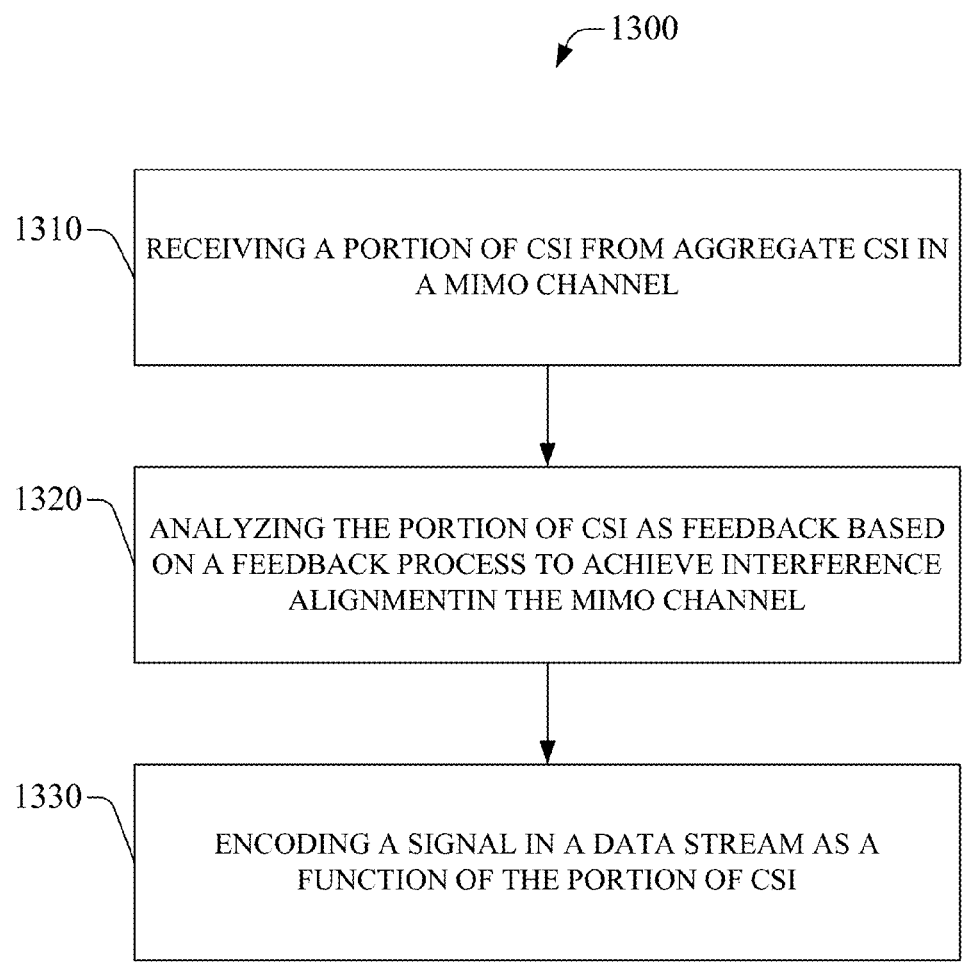
FIG. 13 presents another flow diagram of a process of interference alignment in accordance with the subject feedback processes described.
Figure 14:
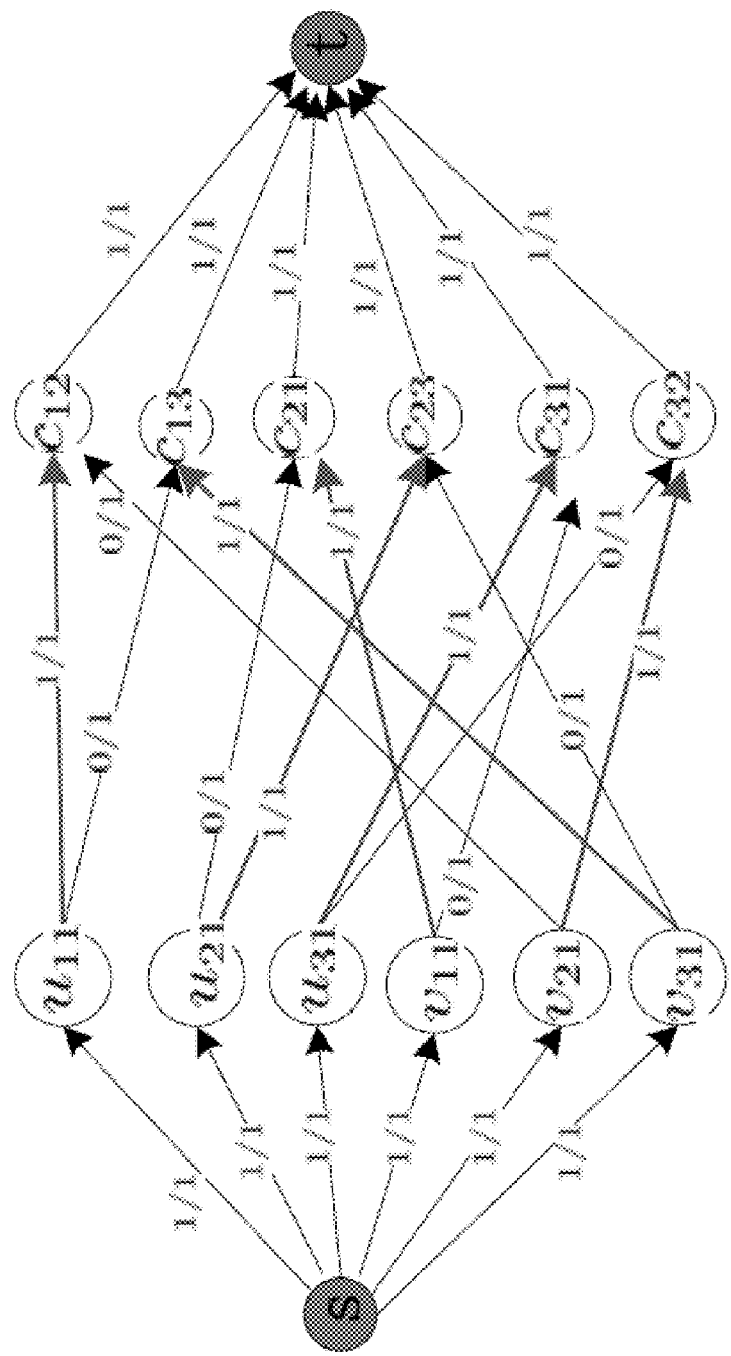
FIG. 14 presents a max-flow graph in accordance with an embodiment.

In view of the example system(s) and apparatuses described above, example method(s) that can be implemented in accordance with the disclosed subject matter can be better appreciated with reference to flowcharts of FIGS. 12 and 13. For purposes of simplicity of explanation, example methods disclosed herein are presented and described as a series of acts; however, it is to be understood and appreciated that the claimed subject matter is not limited by the order of acts, as some acts can occur in different orders and/or concurrently with other acts from that shown and described herein. For example, one or more example methods disclosed herein could alternatively be represented as a series of interrelated states or events, such as in a state diagram. Moreover, interaction diagram(s) can represent methods in accordance with the disclosed subject matter when disparate entities enact disparate portions of the methodologies. Furthermore, not all illustrated acts can be required to implement a described example method in accordance with the subject specification. Further yet, two or more of the disclosed example methods can be implemented in combination with each other, to accomplish one or more features or advantages herein described. It should be further appreciated that the example methods disclosed throughout the subject specification are capable of being stored on an article of manufacture to allow transporting and transferring such methods to computers for execution, and thus implementation, by a processor or for storage in a memory.

FIG. 12 presents a flow diagram of a process 1200 involved with interference alignment as a function of only a portion of CSI being fedback in an interference network.

At 1210, the method 1200 comprises selecting, by a device comprising a processor, a portion of channel state information from among an aggregate of channel state information in a MIMO channel. At 1220, the method 1200 comprises communicating, by the device, feedback that comprises the portion of channel state information selected from the aggregate of channel state information for interference alignment of a number of data streams in the MIMO channel. At 1230, a signal is decoded in a data stream of the number of data streams as a function of the portion of channel state information.

In an aspect, the method operates further by determining a feedback cost of the feedback as a function of the portion of channel state information, wherein the feedback cost represents a sum of dimensions of Grassmannian manifolds that comprise channel state information matrices of the aggregate of channel state information. The feedback, for example, can be determined by characterizing the portion of channel state information with a feedback function that determines the portion of channel state information from the aggregate of channel state information without a quantization data. The portion of channel state information comprises a set of direction information of cross link channel matrices. A tuple of the portion of channel state information can be generated based on the set of direction information according to the feedback function.

FIG. 13 presents another flow diagram of a process 1300. The method 1300 comprises receiving, at 1310, by a device comprising a processor in a multi input multi output channel, a portion of channel state information from among an aggregate of channel state information. At 1320, the method 1300 comprises analyzing, by the device, the portion of channel state information as feedback based on a feedback process defined to achieve interference alignment of a number of data streams in the multi input multi output channel. At 1330, the method comprises encoding, by the device, a signal in a data stream of the number of data streams as a function of the portion of channel state information.

The method can further comprise determining the feedback process by characterizing the portion of channel state information from the aggregate of channel state information with a feedback function that outputs a tuple of subspaces of the portion of channel state information. A feasible feedback profile can be generated that determines a set of parameters of the feedback function that satisfies a feasibility condition based on the portion of channel state information and is dependent upon a trade-off result. A trade-off can be determined as a function of the number of data streams, a number of antenna resources of the multi input multi output channel, and a feedback cost associated with communicating the feedback, according to a degree of freedom the multi input multi output channel. Then, a feedback profile is determined that parameterizes the feedback function based on the trade-off. The feedback profile determines the set of parameters for the feedback function based on at least one of: no feedback associated with a subset of cross link channel state information, feedback of aggregate channel state information for the subset of cross link channel state information, feedback of a null space of a sub-matrix of channel state information for the subset of cross link channel state information, or feedback of a row space of channel state information matrices for the subset of cross link channel state information.

APPENDIX 7.1 Proof of Lemma 1

By substituting the transceiver structure (14) into (4), we have that the constraints (4) in Problem 1 are satisfied for all links from Tx p to Rx q, where $(q,p) \in \{(j,i): \forall j, i \in \Omega_j^{II} \cup \Omega_j^{III}\}$. Hence, the remaining constraints in Problem 1 are reduced to $$\text{rank}(V_i^a) = d_i, \forall i, \text{rank}(U_j^a) = d_j, \forall j; \quad (33)$$

$$(U_j^a)^\dagger [\ldots \quad G_{ji} V_i^a \quad \ldots]_{i \in \Omega_j^I \cup \Omega_j^{IV}} = 0, \forall j. \quad (34)$$

Note that (a) $V_i^a$, $U_i^a$ are functions of $\{H_{ji}: \forall j, i \in \Omega_j^I \cup \Omega_j^{IV}\}$ and hence are independent of $\{H_{ii}: \forall i\}$; and (b) the entries of $H_{ii}$ are i.i.d Gaussian distributed; we have that (3) and (33) are equivalent almost surely. Condition (34) and $\text{rank}(U_j^a) = d_j$ in (33) are equivalent to $$\dim_s\left(\text{span}\left(\{G_{ji} V_i^a\}_{i \in \Omega_j^I \cup \Omega_j^{IV}}\right)\right) \leq M_j^e - d_j. \quad (35)$$

Since links in $\{(j,i): i \in \Omega_j^I\}$ are not fed back, $\{G_{ji} V_i^a\}_{i \in \Omega_j^I}$, will span a random subspace with dimension $(d_j^0 - d_j)$, which is independent of $$\text{span}\left(\{G_{ji} V_i^a\}_{i \in \Omega_j^{IV}}\right)$$

[?]. Hence, (35) can be equivalently transformed to $$\dim_s\left(\text{span}\left(\{G_{ji} V_i^a\}_{i \in \Omega_j^{IV}}\right)\right) \leq M_j^e - d_j - (d_j^0 - d_j), \forall j. \quad (36)$$

$$\Leftrightarrow \exists\, U_j^b \in C^{M_j^e \times d_j^0}, \text{rank}(U_j^b) = d_j^0, (U_j^b)^\dagger G_{ji} V_i^a = 0, \forall j, i \in \Omega_j^{IV}. \quad (37)$$

Hence, the equivalence are proven between Problem 1 and Problem 2.

The relationship is derived between the solutions of the Problem 1 and Problem 2 as follows. Assume $\{V_i^a, U_j^b\}$ are the solution of Problem 2. Then there exists $\{V_i^a, U_j^b\}$ such that (34) is satisfied and $$\begin{bmatrix} S_j^r U_j^a \\ 0 \end{bmatrix}^\dagger H_{ji} \begin{bmatrix} S_i^t V_i^a \\ 0 \end{bmatrix} = 0, \forall i \Rightarrow \dim_s\left(\text{span}\left(\left\{H_{ji}\begin{bmatrix} S_i^t V_i^a \\ 0 \end{bmatrix}\right\}_{V_i}\right)\right) \leq M_j - d_j.$$

Hence, the least $d_j$ eigenvalues of the Hermitian matrix $\Sigma_{i \neq j}(H_{ji} V_i)(H_{ji} V_i)^\dagger$ are 0, and $\{V_i, U_j\}$ given by (17) are the solution of Problem 1 almost surely.

7.2 Proof of Lemma 2

Assume that Problem 2 is feasible under $R_j = I$, $\forall j$. Then there must exist $U_j^b$, $V_i^a$ such that $$U_j^b(S_j^r)^\dagger H_{ji}^s S_i^t V_i^a = 0, \forall j, i \in \Omega_j^{IV}.$$

Then, for any invertible $\{R_j\}$, we have $$(\hat{U}_j^b)^\dagger R_j (S_j^r)^\dagger H_{ji}^s S_i^t V_i^a = 0, \forall j, i \in \Omega_j^{IV}, \quad (38)$$

where $\hat{U}_j^b = (R_j^{-1})^\dagger U_j^b$. Equation (38) shows that the IA constraints (16) are satisfied under $\hat{U}_j^b$. Therefore, Problem 2 is still feasible under other invertible $R_j$.

The converse statement is trivial, hence Lemma 2 is proved.

7.3 Proof of Theorem 1

The necessity of conditions 1, 2 is straight forward. Proving the necessity of condition 3 is focused on.

In the equation sets (16) in Problem 2, there are $U_j = d_j^0 (M_j^e - d_j^0)$ free variables in $$U_j^b \in C^{M_j^e \times d_j^0},$$

$\forall j$, $V_i = d_i (N_i^e - d_i)$ free variables in $$V_i^a \in C^{N_i^e \times d_i},$$

$\forall i$ and $C_{ji} = d_j^0 d_i$ scalar constraints in matrix equation $(U_j^b)^\dagger G_{ji} V_i^a = 0$, $\forall j, i \in \Omega_j^{IV}$ [?, ?]. By analyzing the algebraic dependency of the IA constraints, the number of constraints should be no more than the number of free variables for any subset of IA constraints; hence, $$\sum_{j:(j,i) \in \Omega_{sub}} U_j + \sum_{i:(j,i) \in \Omega_{sub}} V_i \geq \sum_{j,i:(j,i) \in \Omega_{sub}} C_{ji}, \quad (39)$$

$$\forall \Omega_{sub} \subseteq \{(j,i): \forall j, i \in \Omega_j^{IV}\},$$

which is condition 3 in Theorem 1.

7.4 Proof of Theorem 2

(21) can be rewritten as $$y_{ji} @ \text{vec}(G_{ji}^{(1)}) + X_{ji} v + \text{vec}(\tilde{U}_j^\dagger G_{ji}^{(4)} \tilde{V}_i) = 0, \forall j, i \in \Omega_j^{IV}, \quad (40)$$

where $v$ is given by $$v = [\text{vec}(\tilde{U}_1^\dagger)^T \ldots \text{vec}(\tilde{U}_K^\dagger)^T \text{vec}(\tilde{V}_1) \ldots \text{vec}(\tilde{V}_K)^T]^T.$$

Note that each element in $y_{ji}$ is a polynomial function of the elements in $v$. From (40), we have that $X_{ji}$ defined in (22) are the coefficient vectors of the linear terms in $y$. According to (proof of Theorem 2) and (Lemma 3.1-3.3), when the row vectors of $\{X_{ji}\}$ are linearly independent, equation sets (40) have solutions and hence Problem 1 is feasible.

Adopting an approach similar to that in the proof of Corollary 3.1 in, it can further prove that under a given feedback profile L, the row vectors $\{X_{ji}\}$ are either always linearly dependent or independent almost surely for all channel realizations. Hence, when $\{X_{ji}\}$ has linearly independent rows under one random channel realization, Problem 1 is almost surely feasible.

7.5 Proof of Corollary 1

The Corollary 1 is proven via the following two lemmas (Lemma 3 and Lemma 4).

Divide into two steps to prove the sufficient side one is to give the lemma which states sufficiency, the other claims the existence of the binary variables.

Lemma 3 (Sufficient Feasibility Conditions) If there exists a set of binary variables $\{b_{jipq}^t, b_{jipq}^r \in \{0,1\}\}$, $\forall (j,i,p,q) \in \overline{\Omega}$ that satisfy the following constraints, Problem 2 is almost surely feasible.

$$b_{jipq}^t + b_{jipq}^r = 1, \forall j, i, p, q, \quad (41)$$

$$\sum_{\substack{(i,q): \\ (j,i,p,q) \in \overline{\Omega}}} b_{jipq}^r \leq U_{jp}, \forall j, p, \quad (42)$$

$$\sum_{\substack{(j,p): \\ (j,i,p,q) \in \overline{\Omega}}} b_{jipq}^t \leq V_{iq}, \forall i, q, \quad (43)$$

$$b_{jip1}^t = \ldots b_{jipd}^t, \forall j, i, p, \quad (44)$$

where $\overline{\Omega} = \{(j,i,p,q): p \in \{1, \ldots d+d_j^0\}, q \in \{1, \ldots d\}, i \in \Omega_j^{IV}, \forall j\}$, $U_{jp} = (M_j^e - d_j^0)$, $V_{iq} = (N_i^e - d)$ Proof (Outline) Assume there exist binary variables $\{b_{jipq}^t, b_{jipq}^r\}$ satisfying (41)-(44). It can be proved that the row vectors of $\{X_{ji}\}$ defined in Theorem 2 are linearly independent almost surely and the proof is similar to that of [?](Appendix G). We omit the details due to page limit.

Lemma 4 (Existence of the Variables $b_{jipq}^t$, $b_{jipq}^r\}$\$ in Divisible Cases) Assume that the three conditions in Theorem 1 are satisfied and $d_i = d_i d$, $d | M_i^s$, $d | N_i^s$, $\forall i$. Then there exist such binary variables $\{b_{jipq}^t, b_{jipq}^r\}$ satisfying conditions (41)-(44).

Proof: Condition (39) is equivalent to the following:

$$\sum_{\substack{(j,p): \\ (j,i,p,q) \in \overline{\Omega}_{sub}}} U_{jp} + \sum_{\substack{(i,q): \\ (j,i,p,q) \in \overline{\Omega}_{sub}}} V_{iq} \geq |\overline{\Omega}_{sub}|, \forall \overline{\Omega}_{sub} \subseteq \overline{\Omega}. \quad (45)$$

Conditional on (45), is the proof of the existence of binary variables $\{b_{jipq}^t, b_{jipq}^r\}$ satisfying (41)-(44) via a constructive method. Specifically, construct $\{b_{jipq}^t, b_{jipq}^r\}$ by transforming the equation sets (45) to the well known max-flow problem.

A little about the max-flow problem is first introduced. Denote $N = (V, E)$ as a directed graph where $V$ is the set of nodes and $E$ the edges, $s, t \in V$ are the source and sink node respectively. The capacity of an edge, denoted by $c(u,v)$, represents the maximum amount of flow that can pass through an edge. The flow of an edge, denoted by $f(u,v)$ should satisfy $0 \leq f(u,v) \leq c(u,v)$, $\forall (u,v) \in E$ and the conservation of flows, i.e., $$\sum_{u:(u,v) \in E} f(u,v) = \sum_{k:(v,k) \in E} f(v,k) \quad (46)$$

$\forall v \in V / \{s, t\}$. The value of the sum flow is defined by $f_{sum} = \Sigma_{v \in V} f(s,v)$. By adopting this mathematical framework, we have the following lemma which help us to construct $\{b_{jipq}^t, b_{jipq}^r\}$.

Lemma 5 (Max-flow Problem) The max sum flow $f_{sum}$ of the graph N constructed in Algorithm 3 is $f_{sum} = \Sigma_{(j,i,p,q) \in \overline{\Omega}} 1$ under the constraint $f(v_{i1}, c_{jip1}) = f(v_{i2}, c_{jip2}) \ldots f(v_{id}, c_{jipd})$, $f(u_{jp}, c_{jip1}) = f(u_{jp}, c_{jip2}) \ldots f(u_{jp}, c_{jipd})$, $\forall (j,i,p,q) \in \overline{\Omega}$, where $f(x, y)$ denotes the edge flow from vertex x to vertex y in N:

Algorithm 3 (Max Flow Graph $N = (V, E)$):

Step 1: The vertices are given by $V = \{s, t, \{u_{jp}, v_{iq}, c_{jipq}: \forall (j,i,p,q) \in \overline{\Omega}\}\}$ where s and t are the source and sink node respectively.

Step 2: The edges are given by $E=\{(s, u_{jp}), (s,v_{iq}),(u_{jp}, c_{jipq}),(v_{iq},c_{jipq}),(c_{jipq},t):\forall(j,i,p,q)\in\overline{\Omega}\}$.

Step 3: Set the edge capacity $c(s,u_{jp})=U_{jp}$, $c(s, v_{iq})=V_{iq}$, $c(u_{jp}, c_{jipq})=U_{jp}$ $c(v_{iq}, c_{jipq})=v_{iq}$, $c(c_{jipq}, t)=1 \forall(j,i,p,q)\in\overline{\Omega}$.

Proof Please see Appendix 7.6 for the proof.

FIG. 5 illustrates an example of constructed max-flow graph for a K=3 user MIMO network under feedback profile parameters: $N_i^s=M_i^s=2$, $d_i=1$, $\forall i$, $\Omega_j^{IV}=\{1, \ldots j-1, j+1, \ldots K\}$, $\Omega_j^I=\Omega_j^{II}=\Omega_j^{III}=\emptyset$, $\forall j,i$, $j\neq i$. The value f/c near each edge denotes the flow (f) and capacity (c). FIG. 5 illustrates an example of constructed max-flow graph. Based on the flow values $\{f(u,v)\}$ in the flow graph N, construct $b_{jipq}^t, b_{jipq}^r$ as $$b_{jipq}^t=f(v_{iq},c_{jipq}), b_{jipq}^r=f(u_{jp},c_{jipq}). \quad (47)$$

From $f_{sum}=\Sigma_{(j,i,p,q)\in\Omega}-1$, we have $f(c_{jipq}, t)=1$, $\forall(j,i,p,q)\in\overline{\Omega}$. Note that $f(v_{iq}, c_{jipq})$, $f(u_{jp}, c_{jipq})$ are integral as all capacity values on the edges are integral [?]. Hence $b_{jipq}^t+b_{jipq}^r=f(c_{jipq}, t)=1$ and $b_{jipq}^t, b_{jipq}^r\in\{0,1\}$according to (46). On the other hand, it is easy to verify that $\{b_{jipq}^t, b_{jipq}^r\}$ satisfy the conditions (42)-(43) as well according to (46).

7.6 Proof of Lemma 5

By the max-flow min-cut theorem [?], the max flow $f_{sum}\leq\Sigma_{(j,i,p,q)\in\Omega}-1=|\overline{\Omega}|$ The proof of Lemma 5 is via the converse-negative proposition. Assume that $f_{sum}<|\overline{\Omega}|$, then $\exists(x,y,m,n)\in|\overline{\Omega}|$, such that $f(c_{xymn}, t)=0$. Due to the symmetry of the max-flow graph w.r.t. q, we must have $f(c_{xym1}, t)= \ldots =f(c_{xymd}, t)=0$. Furthermore, the network must have no further augmenting paths [?](otherwise, the max-flow can be increased). Construct $\overline{\Omega}_{sub}\subseteq\overline{\Omega}$ as follows:

Algorithm 4 (Construction of $\overline{\Omega}_{sub}$)

Step 1: Initialize $C=\{c_{xym1} \ldots c_{xymd}\}C^c\{C_{jipq}:(j,i,p,q)\in\overline{\Omega}\}/C$, $U=\{u_{xm},v_{yl}, \ldots v_{yd}\}$ and $U_c=\{u_{jp},v_{iq}:\forall(j,i,p,q)\in\overline{\Omega}\}/U$ Step 2: For each $r\in C_c$ such that $\exists z\in U$, $(z,r)\Sigma E$ and $f(z, r)>0$, do: $C=C/\{r\}$, $C_c=C_c/\{r\}$.

Step 3: For each $z\in U_c$ such that $\exists r\in C$, $(z,r)\in E$, do: $U=U\cup\{z\}$, $U_c=U_c/\{z\}$.

Step 4: Iterate between Step 2 and Step 3 until no vertices can be added to C or U. $\overline{\Omega}_{sub}$ is given by $\overline{\Omega}_{sub}=\{(j,i,p,q): c_{jipq}\in C\}$.

Given $U=\{u_{jp}, v_{iq}, \forall(j,i,p,q)\in\overline{\Omega}_{sub}\}$. Furthermore, as the max-flow graph is symmetric w.r.t. q and $d|c(s, u_{jp})$, $\forall j, p$, we must have $f(s,z)=c(s,z)$, $\forall z\in U$ (otherwise there exist further augmenting paths in the graph). Hence, $$\sum_{(j,p):(j,i,p,q)\in\overline{\Omega}_{sub}} U_{jp} + \sum_{(i,q):(j,i,p,q)\in\overline{\Omega}_{sub}} V_{iq} = \sum_{(j,i,p,q)\in\overline{\Omega}_{sub}} (f(c_{jipq}, t)) \leq$$

$$\sum_{\substack{(j,i,p,q)\in\overline{\Omega}_{sub}/\\ \{x,y,m,n=\{1,\cdots d\}\}}} c(c_{jipq}, t) + \sum_{n=1}^{d} f((c_{xymn}, t)) < \sum_{(j,i,p,q)\in\overline{\Omega}_{sub}} 1,$$

which contradicts condition (45).

Via the above converse-negative proposition, Lemma 5 is proved.

7.7 Complexity of Feasibility Checking

If $$\overline{M} < \sum_{j,i\in\Omega_j^{IV}} d_j^0 d_i,$$

where $\overline{M}$ is in Theorem 2, then the IA problem is infeasible under the current feedback profile as condition 3) in Theorem 1 is violated. If $$\overline{M} \geq \sum_{j,i\in\Omega_j^{IV}} d_j^0 d_i,$$

we check the linear independence of the row vectors $\{X_{ji}\}$ by checking whether the determinant of matrix $\overline{X}$ is nonzero with complexity $O(\overline{M}^3)=O((KN)^3)[?]$:

$$X = \left[[\cdots X_{ji}^T \cdots]_{j,i\in\Omega_j^{IV}}(X^{[c]})^T\right] \in C^{\overline{M}\times\overline{M}}$$

where $X^{[c]}$ is a $$\left(\overline{M} - \sum_{j,i\in\Omega_j^{IV}} d_j^0 d_i\right)\times\overline{M}$$

random matrix independent of $\{X_{ji}\}$. Note the row vectors of $\{X_{ji}: \forall j,i\in\Omega_j^{IV}\}$ are independent if and only if $\det(\overline{X})\neq 0$.

7.8 Proof of Theorem 3

Sketch the proof due to page limit. In the initial step in Algorithm 2, L becomes: $N_i^s=Kd$, $M_i^s=\min(M,Kd)$, $\forall i$, $\Omega_j^I=\Omega_j^{II}=\Omega_j^{III}=\emptyset$, $\Omega_j^{IV}=\{1, \ldots j-1, j+1, \ldots K\}$, $\forall j$. After that, (a) if $$d \leq \frac{M}{K},$$

Algorithm 2 will update L by adopting strategy $S^I(j,i)$ for all $j,i,j\neq i$ and then adopting $S^V(j)$, for all j until we obtain the desired result; (b) if $$\frac{M}{K} < d \leq M,$$

d|M, Algorithm 2 will update L through the following four stages sequentially:

A: keep adopting strategy $S^{IV}(i)$ for all $K^s+1\leq i\leq K$, and we obtain the updated L: $N_i^s=Kd$ for $1\leq i\leq I$ $K^s$ and $N_i^s=d$ for $K^s+1\leq i\leq K$, $M_i^s=M$, $\forall i$, $\Omega_j^{II}=\{t:t=K^s+1, \ldots K, t\neq j\}$, $\Omega_j^I=\Omega_j^{III}=\emptyset$, $\Omega_j^{IV}=\{1, \ldots j-1, j+1, \ldots K\}/\Omega_j^{II}$, $\forall j$.

B: keep adopting strategy $S^{III}(j,i)$ for all $1\leq j,i\leq K^s+1,i\neq j$, and we obtain the updated L: $N_i^s, M_i^s, \Omega_j^I, \Omega_j^{II}$ the same as in A, $\Omega_j^{III}=\{t:t=1, \ldots, K^s, t\neq j\}$, $\Omega_j^{IV}=\{1, \ldots j-1, j+1, \ldots K\}/(\Omega_j^{II}\cup\Omega_j^{III})$, $\forall j$.

C: keep adopting strategy $S^V(j)$ for all $K^s+2\leq j\leq K$ with each $S^V(j)$ repeating d times, and we obtain the updated L: $N_i^s=Kd$, $M_i^s=M$ for $1\leq i\leq K^s$ and $N_i^s=d$, $M_i^s=M-d$ for $K^s+1\leq i\leq K$, $\forall i$, $\Omega_j^I, \Omega_j^{II}, \Omega_j^{III}, \Omega_j^{IV}$ the same as in B.

D: keep adopting strategy $S^{III}(j,i)$ for all $K^s+2\leq j\leq K$, $1\leq i\leq K^s+1$, and we obtain the final feedback profile L. Substitute the final L into (10), we obtain the associated feedback dimension $D_p$.

Figure 16:
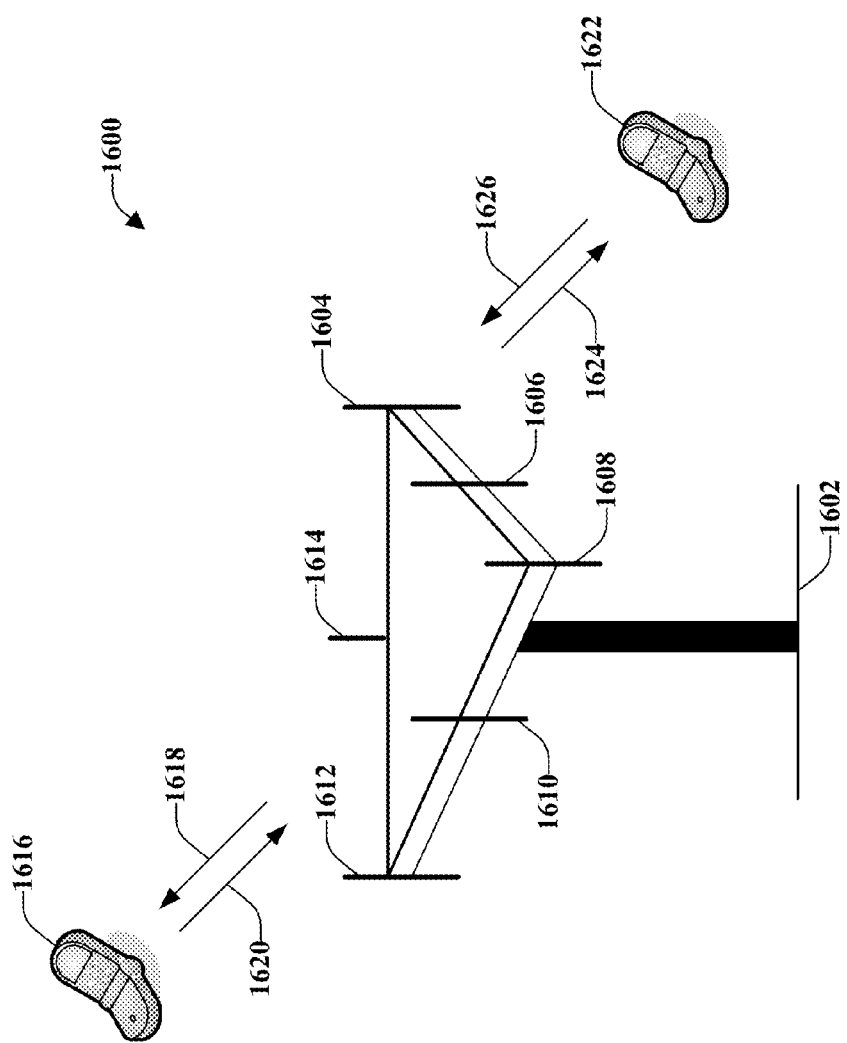
FIG. 16 illustrates a block diagram of an exemplary embodiment of an access point to implement and exploit one or more features or aspects of the disclosed subject matter.

Referring now to FIG. 16 a multiple access wireless communication system 1600 according to one or more aspects is illustrated. A wireless communication system 1600 can include one or more base stations in contact with one or more user devices. Each base station provides coverage for a plurality of sectors. A three-sector base station 1602 is illustrated that includes multiple antenna groups, one including antennas 1604 and 1606, another including antennas 1608 and 1610, and a third including antennas 1612 and 1614. According to the figure, only two antennas are shown for each antenna group, however, more or fewer antennas can be utilized for each antenna group. Mobile device 1616 is in communication with antennas 1612 and 1614, where antennas 1612 and 1614 transmit information to mobile device 1616 over forward link 1618 and receive information from mobile device 1616 over reverse link 1620. Forward link (or downlink) refers to communication link from base stations to mobile devices, and reverse link (or uplink) refers to communication link from mobile devices to base stations. Mobile device 1622 is in communication with antennas 1604 and 1606, where antennas 1604 and 1606 transmit information to mobile device 1622 over forward link 1624 and receive information from mobile device 1622 over reverse link 1626. In a FDD system, for example, communication links 1618, 1620, 1624, and 1626 might utilize different frequencies for communication. For example, forward link 1618 might use a different frequency than the frequency utilized by reverse link 1620.

Each group of antennas and/or the area in which they are designated to communicate can be referred to as a sector of base station 1602. In one or more aspects, antenna groups each are designed to communicate to mobile devices in a sector or the areas covered by base station 1602. A base station can be a fixed station used for communicating with mobile devices.

In communication over forward links 1618 and 1624, transmitting antennas of base station 1602 can utilize beamforming in order to improve a signal-to-noise ratio of forward links for different mobile devices 1616 and 1622. Also, a base station utilizing beamforming to transmit to mobile devices scattered randomly through its coverage area might cause less interference to mobile devices in neighboring cells than the interference that can be caused by a base station transmitting through a single antenna to all mobile devices in its coverage area.

Figure 15:
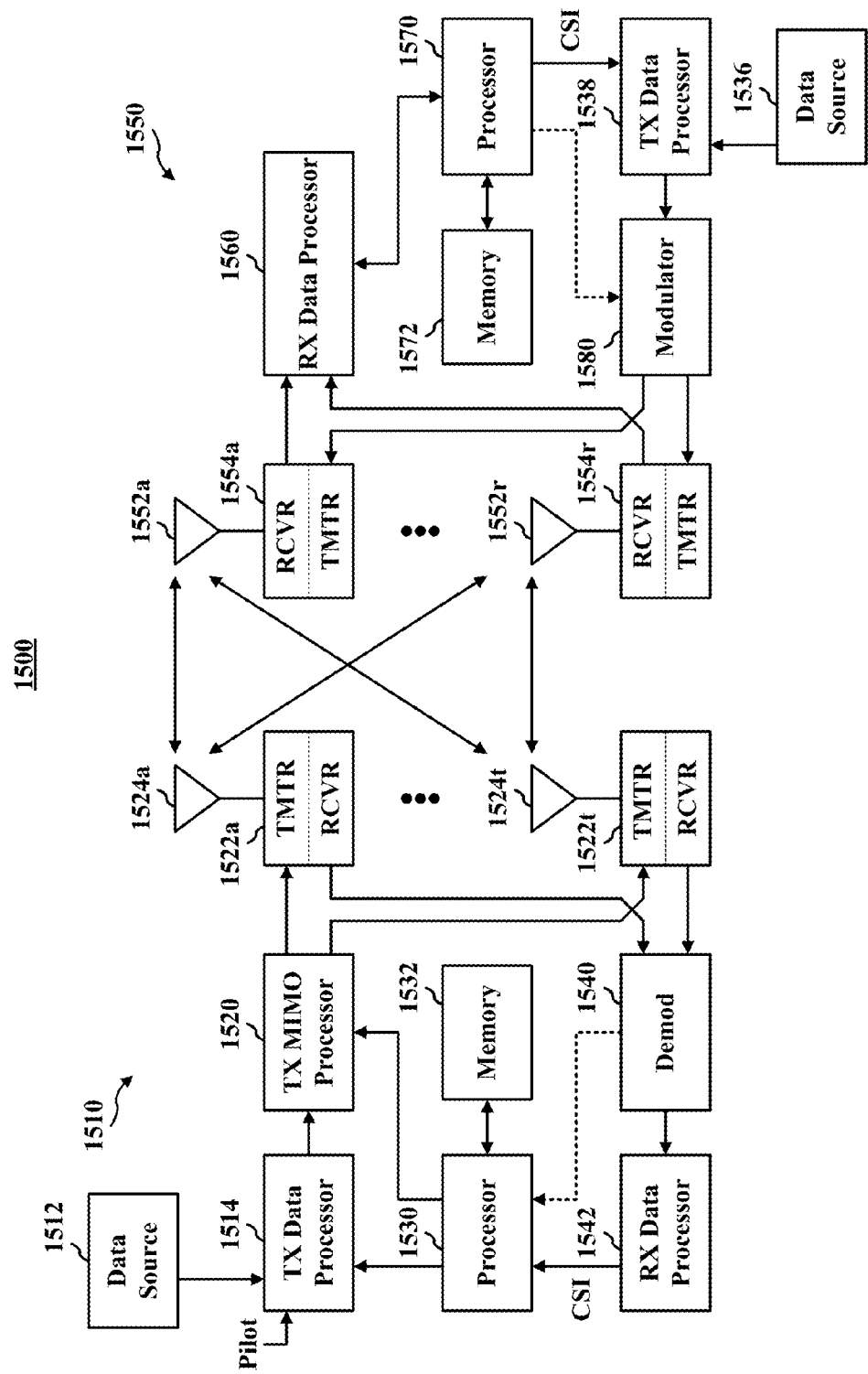
FIG. 15 is an illustration of an exemplary wireless network environment that can be employed in conjunction with the various systems and methods described herein.

FIG. 15 shows an example wireless communication system 1500. The wireless communication system 1500 depicts one base station 1510 and one access terminal 1550 for sake of brevity. However, it is to be appreciated that system 1500 can include more than one base station and/or more than one access terminal, wherein additional base stations and/or access terminals can be substantially similar or different from example base station 1510 and access terminal 1550 described below. In addition, it is to be appreciated that base station 1510 and/or access terminal 1550 can employ the systems and/or methods described herein to facilitate wireless communication there between.

At base station 1510, traffic data for a number of data streams is provided from a data source 1512 to a transmit (TX) data processor 1514. According to an example, each data stream can be transmitted over a respective antenna. TX data processor 1514 formats, codes, and interleaves the traffic data stream based on a particular coding scheme selected for that data stream to provide coded data.

The coded data for each data stream can be multiplexed with pilot data using orthogonal frequency division multiplexing (OFDM) techniques. Additionally or alternatively, the pilot symbols can be frequency division multiplexed (FDM), time division multiplexed (TDM), or code division multiplexed (CDM). The pilot data is typically a known data pattern that is processed in a known manner and can be used at access terminal 1550 to estimate channel response. The multiplexed pilot and coded data for each data stream can be modulated (e.g., symbol mapped) based on a particular modulation scheme (e.g., binary phase-shift keying (BPSK), quadrature phase-shift keying (QPSK), M-phase-shift keying (M-PSK), M-quadrature amplitude modulation (M-QAM), etc.) selected for that data stream to provide modulation symbols. The data rate, coding, and modulation for each data stream can be determined by instructions performed or provided by processor 1530.

The modulation symbols for the data streams can be provided to a TX MIMO processor 1520, which can further process the modulation symbols (e.g., for OFDM). TX MIMO processor 1520 then provides $N_T$ modulation symbol streams to $N_T$ transmitters (TMTR) 1522a through 1522t. In various embodiments, TX MIMO processor 1520 applies beamforming weights to the symbols of the data streams and to the antenna from which the symbol is being transmitted.

Each transmitter 1522 receives and processes a respective symbol stream to provide one or more analog signals, and further conditions (e.g., amplifies, filters, and upconverts) the analog signals to provide a modulated signal suitable for transmission over the MIMO channel. Further, $N_T$ modulated signals from transmitters 1522a through 1522t are transmitted from $N_T$ antennas 1524a through 1524t, respectively.

At access terminal 1550, the transmitted modulated signals are received by $N_R$ antennas 1552a through 1552r and the received signal from each antenna 1552 is provided to a respective receiver (RCVR) 1554a through 1554r. Each receiver 1554 conditions (e.g., filters, amplifies, and downconverts) a respective signal, digitizes the conditioned signal to provide samples, and further processes the samples to provide a corresponding "received" symbol stream.

An RX data processor 1560 can receive and process the $N_R$ received symbol streams from $N_R$ receivers 1554 based on a particular receiver processing technique to provide $N_T$ "detected" symbol streams. RX data processor 1560 can demodulate, deinterleave, and decode each detected symbol stream to recover the traffic data for the data stream. The processing by RX data processor 1560 is complementary to that performed by TX MIMO processor 1520 and TX data processor 1514 at base station 1510.

A processor 1570 can periodically determine which available technology to utilize as discussed above. Further, processor 1570 can formulate a reverse link message comprising a matrix index portion and a rank value portion.

The reverse link message can comprise various types of information regarding the communication link and/or the received data stream. The reverse link message can be processed by a TX data processor 1538, which also receives traffic data for a number of data streams from a data source 1536, modulated by a modulator 1580, conditioned by transmitters 1554a through 1554r, and transmitted back to base station 1510.

At base station 1510, the modulated signals from access terminal 1550 are received by antennas 1524, conditioned by receivers 1522, demodulated by a demodulator 1540, and processed by a RX data processor 1542 to extract the reverse link message transmitted by access terminal 1550. Further, processor 1530 can process the extracted message to determine which precoding matrix to use for determining the beamforming weights.

Processors 1530 and 1570 can direct (e.g., control, coordinate, manage, etc.) operation at base station 1510 and access terminal 1550, respectively. Respective processors 1530 and 1570 can be associated with memory 1532 and 1572 that store program codes and data. Processors 1530 and 1570 can also perform computations to derive frequency and impulse response estimates for the uplink and downlink, respectively.

Figure 17:
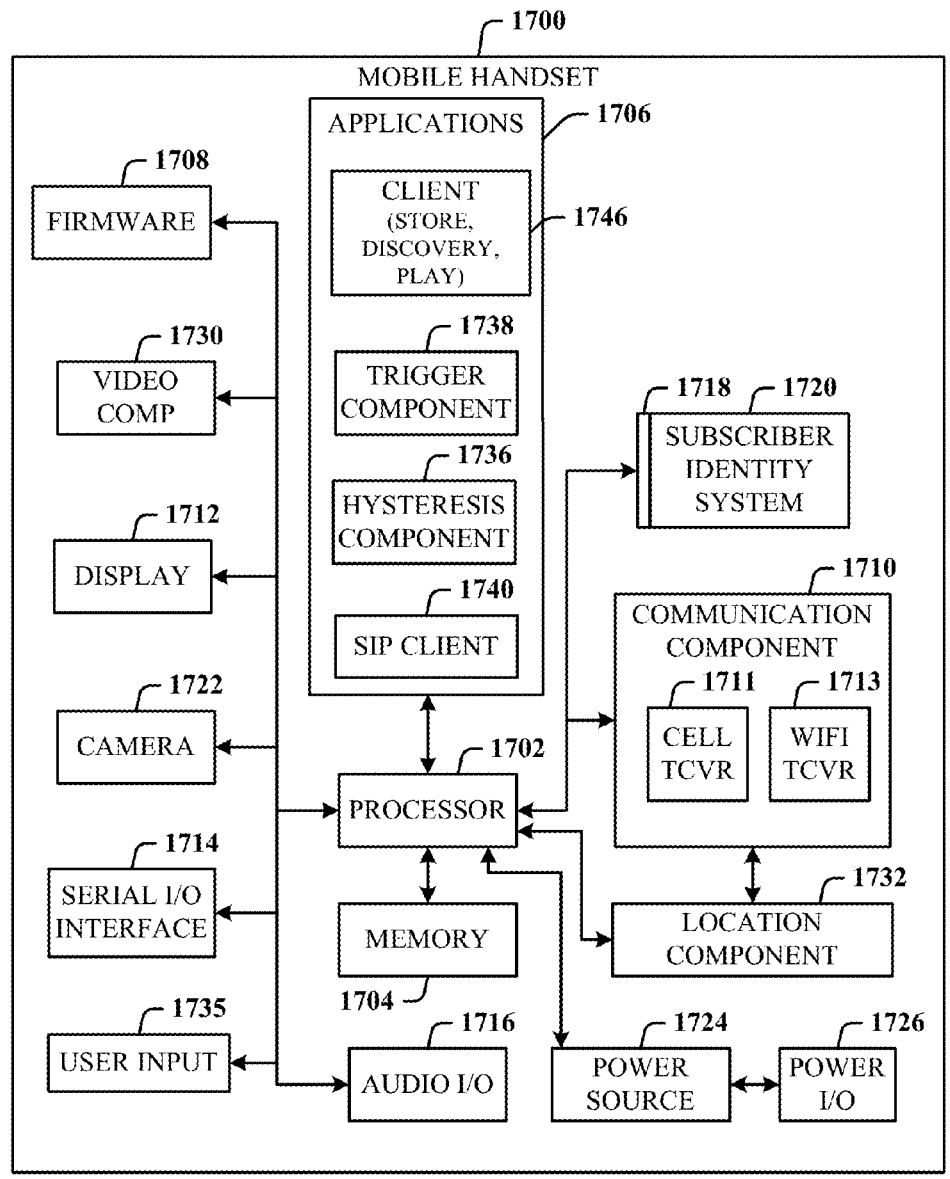
FIG. 17 illustrates an example of a device, a client device in accordance with the embodiments disclosed herein.

FIG. 17 illustrates a schematic block diagram of an exemplary device 1700 capable of employing the subject system in accordance with some embodiments of the invention. The device is a mobile handset 1700 In order to provide additional context for various aspects thereof, FIG. 17 and the following discussion are intended to provide a brief, general description of a suitable environment 1700 in which the various aspects can be implemented. While the description includes a general context of computer-executable instructions, those skilled in the art will recognize that the various embodiments also can be implemented in combination with other program modules and/or as a combination of hardware and software.

Generally, applications (e.g., program modules) can include routines, programs, components, data structures, etc., that perform particular tasks or implement particular abstract data types. Moreover, those skilled in the art will appreciate that the inventive methods can be practiced with other system configurations, including single-processor or multiprocessor systems, minicomputers, mainframe computers, as well as personal computers, hand-held computing devices, microprocessor-based or programmable consumer electronics, and the like, each of which can be operatively coupled to one or more associated devices.

A computing device can typically include a variety of computer-readable media. Computer readable media can be any available media that can be accessed by the computer and includes both volatile and non-volatile media, removable and non-removable media. By way of example and not limitation, computer-readable media can comprise computer storage media and communication media. Computer storage media includes both volatile and non-volatile, removable and non-removable media implemented in any method or technology for storage of information such as computer-readable instructions, data structures, program modules or other data. Computer storage media can include, but is not limited to, RAM, ROM, EEPROM, flash memory or other memory technology, CD ROM, digital video disk (DVD) or other optical disk storage, magnetic cassettes, magnetic tape, magnetic disk storage or other magnetic storage devices, or any other medium which can be used to store the desired information and which can be accessed by the computer.

Communication media typically embodies computer-readable instructions, data structures, program modules or other data in a modulated data signal such as a carrier wave or other transport mechanism, and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, RF, infrared and other wireless media. Combinations of the any of the above should also be included within the scope of computer-readable media.

The handset 1700 includes a processor 1702 for controlling and processing all onboard operations and functions. A memory 1704 interfaces to the processor 1702 for storage of data and one or more applications 1706 (e.g., a video player software, user feedback component software, . . . ). Other applications can include voice recognition of predetermined voice commands that facilitate initiation of the user feedback signals. The applications 1706 can be stored in the memory 1704 and/or in a firmware 1708, and executed by the processor 1702 from either or both the memory 1704 or/and the firmware 1708. The firmware 1708 can also store startup code for execution in initializing the handset 1700. A communications component 1710 interfaces to the processor 1702 to facilitate wired/wireless communication with external systems, e.g., cellular networks, VoIP networks, and so on. Here, the communications component 1710 can also include a suitable cellular transceiver 1711 (e.g., a GSM transceiver) and an unlicensed transceiver 1713 (e.g., WiFi, WiMax) for corresponding signal communications. The handset 1700 can be a device such as a cellular telephone, a PDA with mobile communications capabilities, and messaging-centric devices. The communications component 1710 also facilitates communications reception from terrestrial radio networks (e.g., broadcast), digital satellite radio networks, and Internet-based radio services networks.

The handset 1700 includes a display 1712 for displaying text, images, video, telephony functions (e.g., a Caller ID function), setup functions, and for user input. The display 1712 can also accommodate the presentation of multimedia content (e.g., music metadata, messages, wallpaper, graphics, . . . ). A serial I/O interface 1714 is provided in communication with the processor 1702 to facilitate wired and/or wireless serial communications (e.g., USB, and/or IEEE 1394) through a hardwire connection, and other serial input devices (e.g., a keyboard, keypad, and mouse). This supports updating and troubleshooting the handset 1700, for example. Audio capabilities are provided with an audio I/O component 1716, which can include a speaker for the output of audio signals related to, for example, indication that the user pressed the proper key or key combination to initiate the user feedback signal. The audio I/O component 1716 also facilitates the input of audio signals through a microphone to record data and/or telephony voice data, and for inputting voice signals for telephone conversations.

The handset 1700 can include a slot interface 1718 for accommodating a SIC (Subscriber Identity Component) in the form factor of a card Subscriber Identity Module (SIM) or universal SIM 1720, and interfacing the SIM card 1720 with the processor 1702. However, it is to be appreciated that the SIM card 920 can be manufactured into the handset 1700, and updated by downloading data and software thereinto.

The handset 1700 can process IP data traffic through the communication component 1710 to accommodate IP traffic from an IP network such as, for example, the Internet, a corporate intranet, a home network, a person area network, etc., through an ISP or broadband cable provider. Thus, VoIP traffic can be utilized by the handset 1700 and IP-based multimedia content can be received in either an encoded or decoded format.

A video processing component 1722 (e.g., a camera) can be provided for decoding encoded multimedia content. The handset 1700 also includes a power source 1724 in the form of batteries and/or an AC power subsystem, which power source 1724 can interface to an external power system or charging equipment (not shown) by a power I/O component 1726.

The handset 1700 can also include a video component 1730 for processing video content received and, for recording and transmitting video content. A location tracking component 1732 facilitates geographically locating the handset 1700. As described hereinabove, this can occur when the user initiates the feedback signal automatically or manually. A user input component 1735 facilitates the user initiating the quality feedback signal. The input component can include such conventional input device technologies such as a keypad, keyboard, mouse, stylus pen, and touch screen, for example.

Referring again to the applications 1706, a hysteresis component 1736 facilitates the analysis and processing of hysteresis data, which is utilized to determine when to associate with the access point. A software trigger component 1738 can be provided that facilitates triggering of the hysteresis component 1738 when the WiFi transceiver 1713 detects the beacon of the access point. A SIP client 1740 enables the handset 1700 to support SIP protocols and register the subscriber with the SIP registrar server. The applications 1706 can also include a client 1746 that provides at least the capability of discovery, play and store of multimedia content, for example, music.

The handset 1700, as indicated above related to the communications component 1710, includes an indoor network radio transceiver 1713 (e.g., WiFi transceiver). This function supports the indoor radio link, such as IEEE 802.11, for the dual-mode GSM handset 1700. The handset 1700 can accommodate at least satellite radio services through a handset that can combine wireless voice and digital radio chipsets into a single handheld device.

Figure 18:
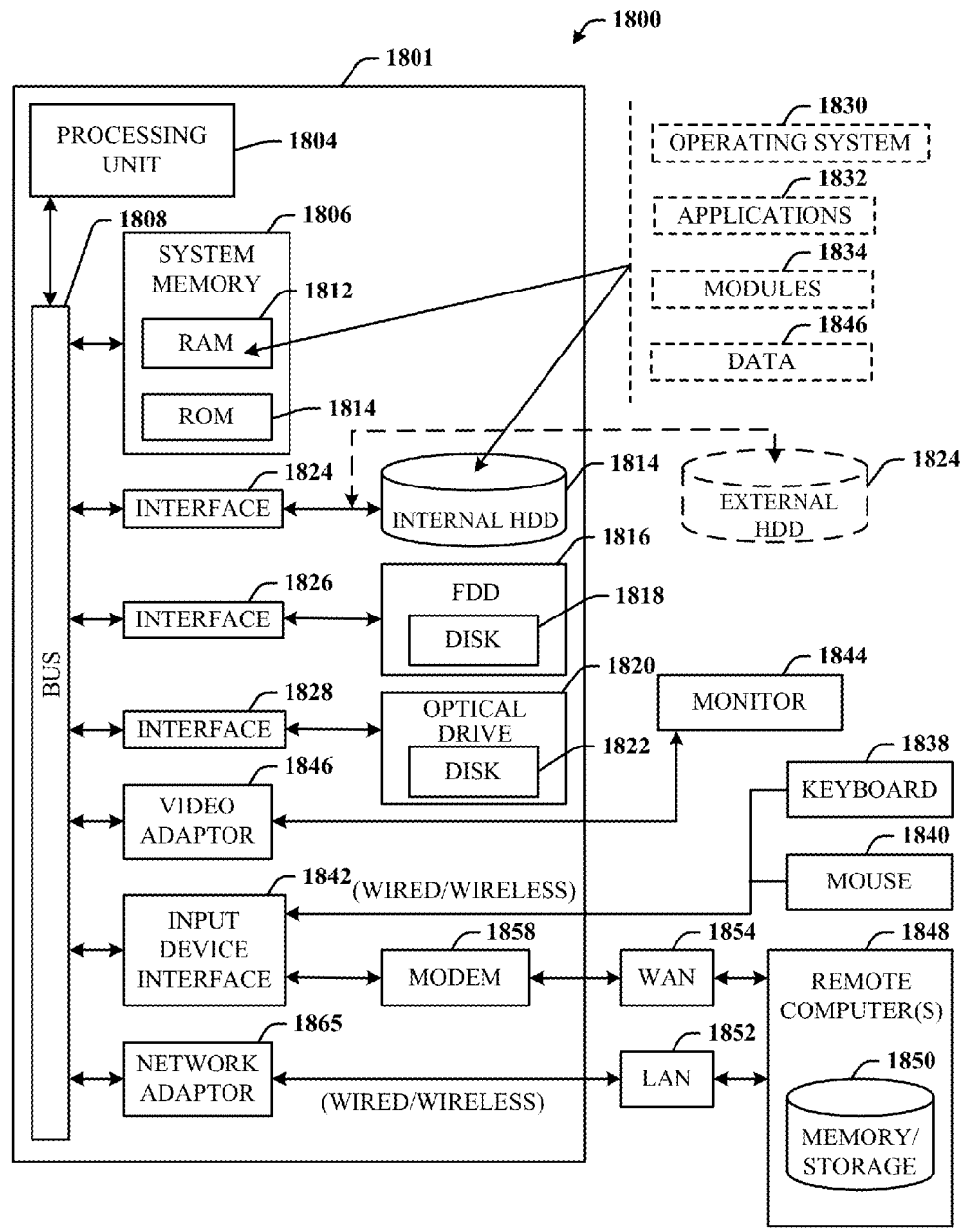
FIG. 18 illustrates a block diagram of a computer operable to execute the disclosed interference adaption platform and MAC adaptation platform.

Referring now to FIG. 18, there is illustrated a block diagram of a computer operable to provide networking and communication capabilities between a wired or wireless communication network and a server and/or communication device. In order to provide additional context for various aspects thereof, FIG. 18 and the following discussion are intended to provide a brief, general description of a suitable computing environment 1800 in which the various aspects of the various embodiments can be implemented. While the description above is in the general context of computer-executable instructions that can run on one or more computers, those skilled in the art will recognize that the various embodiments also can be implemented in combination with other program modules and/or as a combination of hardware and software.

Generally, program modules include routines, programs, components, data structures, etc., that perform particular tasks or implement particular abstract data types. Moreover, those skilled in the art will appreciate that the inventive methods can be practiced with other computer system configurations, including single-processor or multiprocessor computer systems, minicomputers, mainframe computers, as well as personal computers, hand-held computing devices, microprocessor-based or programmable consumer electronics, and the like, each of which can be operatively coupled to one or more associated devices.

The illustrated aspects of the various embodiments can also be practiced in distributed computing environments where certain tasks are performed by remote processing devices that are linked through a communications network. In a distributed computing environment, program modules can be located in both local and remote memory storage devices.

A computer typically includes a variety of computer readable media. Computer readable media can be any available media that can be accessed by the computer and includes both volatile and non-volatile media, removable and non-removable media. By way of example, and not limitation, computer-readable media can comprise computer storage media and communication media. Computer storage media includes both volatile and non-volatile, removable and non-removable media implemented in any method or technology for storage of information such as computer-readable instructions, data structures, program modules or other data. Computer storage media includes, but is not limited to, RAM, ROM, EEPROM, flash memory or other memory technology, CD ROM, digital video disk (DVD) or other optical disk storage, magnetic cassettes, magnetic tape, magnetic disk storage or other magnetic storage devices, or any other medium which can be used to store the desired information and which can be accessed by the computer.

Communication media typically embodies computer-readable instructions, data structures, program modules or other data in a modulated data signal such as a carrier wave or other transport mechanism, and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, RF, infrared and other wireless media. Combinations of the any of the above should also be included within the scope of computer-readable media.

With reference again to FIG. 18, the exemplary environment 1800 for implementing various aspects includes a computer 1801, the computer 1801 including a processing unit 1804, a system memory 1806 and a system bus 1808. The system bus 1808 couples system components including, but not limited to, the system memory 1806 to the processing unit 1804. The processing unit 1804 can be any of various commercially available processors. Dual microprocessors and other multi processor architectures can also be employed as the processing unit 1804.

The system bus 1808 can be any of several types of bus structure that can further interconnect to a memory bus (with or without a memory controller), a peripheral bus, and a local bus using any of a variety of commercially available bus architectures. The system memory 1806 includes read-only memory (ROM) 1810 and random access memory (RAM) 1812. A basic input/output system (BIOS) is stored in a non-volatile memory 1810 such as ROM, EPROM, EEPROM, which BIOS contains the basic routines that help to transfer information between elements within the computer 1801, such as during start-up. The RAM 1812 can also include a high-speed RAM such as static RAM for caching data.

The computer 1801 further includes an internal hard disk drive (HDD) 1814 (e.g., EIDE, SATA), which internal hard disk drive 1814 can also be configured for external use in a suitable chassis (not shown), a magnetic floppy disk drive (FDD) 1816, (e.g., to read from or write to a removable diskette 1818) and an optical disk drive 1820, (e.g., reading a CD-ROM disk 1822 or, to read from or write to other high capacity optical media such as the DVD). The hard disk drive 1814, magnetic disk drive 1816 and optical disk drive 1820 can be connected to the system bus 1808 by a hard disk drive interface 1824, a magnetic disk drive interface 1826 and an optical drive interface 1828, respectively. The interface 1824 for external drive implementations includes at least one or both of Universal Serial Bus (USB) and IEEE 1394 interface technologies. Other external drive connection technologies are within contemplation of the subject embodiments.

The drives and their associated computer-readable media provide nonvolatile storage of data, data structures, computer-executable instructions, and so forth. For the computer 1802, the drives and media accommodate the storage of any data in a suitable digital format. Although the description of computer-readable media above refers to a HDD, a removable magnetic diskette, and a removable optical media such as a CD or DVD, it should be appreciated by those skilled in the art that other types of media which are readable by a computer, such as zip drives, magnetic cassettes, flash memory cards, cartridges, and the like, can also be used in the exemplary operating environment, and further, that any such media can contain computer-executable instructions for performing the methods of the disclosed embodiments.

A number of program modules can be stored in the drives and RAM 1812, including an operating system 1830, one or more application programs 1832, other program modules 1834 and program data 1836. All or portions of the operating system, applications, modules, and/or data can also be cached in the RAM 1812. It is to be appreciated that the various embodiments can be implemented with various commercially available operating systems or combinations of operating systems.

A user can enter commands and information into the computer 1801 through one or more wired/wireless input devices, e.g., a keyboard 1838 and a pointing device, such as a mouse 1840. Other input devices (not shown) can include a microphone, an IR remote control, a joystick, a game pad, a stylus pen, touch screen, or the like. These and other input devices are often connected to the processing unit 1804 through an input device interface 1842 that is coupled to the system bus 1808, but can be connected by other interfaces, such as a parallel port, an IEEE 1894 serial port, a game port, a USB port, an IR interface, etc.

A monitor 1844 or other type of display device is also connected to the system bus 1808 through an interface, such as a video adapter 1846. In addition to the monitor 1844, a computer typically includes other peripheral output devices (not shown), such as speakers, printers, etc.

The computer 1801 can operate in a networked environment using logical connections by wired and/or wireless communications to one or more remote computers, such as a remote computer(s) 1848. The remote computer(s) 1848 can be a workstation, a server computer, a router, a personal computer, portable computer, microprocessor-based entertainment appliance, a peer device or other common network node, and typically includes many or all of the elements described relative to the computer 1801, although, for purposes of brevity, only a memory/storage device 1850 is illustrated. The logical connections depicted include wired/wireless connectivity to a local area network (LAN) 1852 and/or larger networks, e.g., a wide area network (WAN) 1854. Such LAN and WAN networking environments are commonplace in offices and companies, and facilitate enterprise-wide computer networks, such as intranets, all of which can connect to a global communications network, e.g., the Internet.

When used in a LAN networking environment, the computer 1801 is connected to the local network 1852 through a wired and/or wireless communication network interface or adapter 1856. The adaptor 1856 can facilitate wired or wireless communication to the LAN 1852, which can also include a wireless access point disposed thereon for communicating with the wireless adaptor 1856.

When used in a WAN networking environment, the computer 1801 can include a modem 1858, or is connected to a communications server on the WAN 1854, or has other means for establishing communications over the WAN 1854, such as by way of the Internet. The modem 1858, which can be internal or external and a wired or wireless device, is connected to the system bus 1808 through the serial port interface 1842. In a networked environment, program modules depicted relative to the computer 1801, or portions thereof, can be stored in the remote memory/storage device 1850. It will be appreciated that the network connections shown are exemplary and other means of establishing a communications link between the computers can be used.

It is to be understood that aspects described herein can be implemented by hardware, software, firmware, or any combination thereof. When implemented in software, functions can be stored on or transmitted over as one or more instructions or code on a computer-readable medium. Computer-readable media includes both computer storage media and communication media including any medium that facilitates transfer of a computer program from one place to another. A storage media can be any available media that can be accessed by a general purpose or special purpose computer. By way of example, and not limitation, such computer-readable media can comprise RAM, ROM, EEPROM, CD-ROM or other optical disk storage, magnetic disk storage or other magnetic storage devices, or any other medium that can be used to carry or store desired program code means in the form of instructions or data structures and that can be accessed by a general-purpose or special-purpose computer, or a general-purpose or special-purpose processor. Also, any connection is properly termed a computer-readable medium. For example, if software is transmitted from a website, server, or other remote source using a coaxial cable, fiber optic cable, twisted pair, digital subscriber line (DSL), or wireless technologies such as infrared, radio, and microwave, then coaxial cable, fiber optic cable, twisted pair, DSL, or wireless technologies such as infrared, radio, and microwave are included in the definition of medium. Disk and disc, as used herein, includes compact disc (CD), laser disc, optical disc, digital versatile disc (DVD), floppy disk and blu-ray disc where disks usually reproduce data magnetically, while discs reproduce data optically with lasers. Combinations of the above should also be included within the scope of computer-readable media.

Various illustrative logics, logical blocks, modules, and circuits described in connection with aspects disclosed herein can be implemented or performed with a general purpose processor, a digital signal processor (DSP), an application specific integrated circuit (ASIC), a field programmable gate array (FPGA) or other programmable logic device, discrete gate or transistor logic, discrete hardware components, or any combination thereof designed to perform functions described herein. A general-purpose processor can be a microprocessor, but, in the alternative, processor can be any conventional processor, controller, microcontroller, or state machine. A processor can also be implemented as a combination of computing devices, for example, a combination of a DSP and a microprocessor, a plurality of microprocessors, one or more microprocessors in conjunction with a DSP core, or any other such configuration. Additionally, at least one processor can comprise one or more modules operable to perform one or more of the s and/or actions described herein.

For a software implementation, techniques described herein can be implemented with modules (e.g., procedures, functions, and so on) that perform functions described herein. Software codes can be stored in memory units and executed by processors. Memory unit can be implemented within processor or external to processor, in which case memory unit can be communicatively coupled to processor through various means as is known in the art. Further, at least one processor can include one or more modules operable to perform functions described herein.

Techniques described herein can be used for various wireless communication systems such as CDMA, TDMA, FDMA, OFDMA, SC-FDMA and other systems. The terms "system" and "network" are often used interchangeably. A CDMA system can implement a radio technology such as Universal Terrestrial Radio Access (UTRA), CDMA1800, etc. UTRA includes Wideband-CDMA (W-CDMA) and other variants of CDMA. Further, CDMA1800 covers IS-1800, IS-95 and IS-856 standards. A TDMA system can implement a radio technology such as Global System for Mobile Communications (GSM). An OFDMA system can implement a radio technology such as Evolved UTRA (E-UTRA), Ultra Mobile Broadband (UMB), IEEE 802.11 (Wi-Fi), IEEE 802.16 (WiMAX), IEEE 802.18, Flash-OFDM, etc. UTRA and E-UTRA are part of Universal Mobile Telecommunication System (UMTS). 3GPP Long Term Evolution (LTE) is a release of UMTS that uses E-UTRA, which employs OFDMA on downlink and SC-FDMA on uplink. UTRA, E-UTRA, UMTS, LTE and GSM are described in documents from an organization named "3rd Generation Partnership Project" (3GPP). Additionally, CDMA1800 and UMB are described in documents from an organization named "3rd Generation Partnership Project 2" (3GPP2). Further, such wireless communication systems can additionally include peer-to-peer (e.g., mobile-to-mobile) ad hoc network systems often using unpaired unlicensed spectrums, 802.xx wireless LAN, BLUETOOTH and any other short- or long-range, wireless communication techniques.

Single carrier frequency division multiple access (SC-FDMA), which utilizes single carrier modulation and frequency domain equalization is a technique that can be utilized with the disclosed aspects. SC-FDMA has similar performance and essentially a similar overall complexity as those of OFDMA system. SC-FDMA signal has lower peak-to-average power ratio (PAPR) because of its inherent single carrier structure. SC-FDMA can be utilized in uplink communications where lower PAPR can benefit a mobile terminal in terms of transmit power efficiency.

Moreover, various aspects or features described herein can be implemented as a method, apparatus, or article of manufacture using standard programming and/or engineering techniques. The term "article of manufacture" as used herein is intended to encompass a computer program accessible from any computer-readable device, carrier, or media. For example, computer-readable media can include but are not limited to magnetic storage devices (e.g., hard disk, floppy disk, magnetic strips, etc.), optical disks (e.g., compact disk (CD), digital versatile disk (DVD), etc.), smart cards, and flash memory devices (e.g., EPROM, card, stick, key drive, etc.). Additionally, various storage media described herein can represent one or more devices and/or other machine-readable media for storing information. The term "machine-readable medium" can include, without being limited to, wireless channels and various other media capable of storing, containing, and/or carrying instruction(s) and/or data. Additionally, a computer program product can include a computer readable medium having one or more instructions or codes operable to cause a computer to perform functions described herein.

Further, the actions of a method or algorithm described in connection with aspects disclosed herein can be embodied directly in hardware, in a software module executed by a processor, or a combination thereof. A software module can reside in RAM memory, flash memory, ROM memory, EPROM memory, EEPROM memory, registers, a hard disk, a removable disk, a CD-ROM, or any other form of storage medium known in the art. An exemplary storage medium can be coupled to processor, such that processor can read information from, and write information to, storage medium. In the alternative, storage medium can be integral to processor. Further, in some aspects, processor and storage medium can reside in an ASIC. Additionally, ASIC can reside in a user terminal. In the alternative, processor and storage medium can reside as discrete components in a user terminal. Additionally, in some aspects, the s and/or actions of a method or algorithm can reside as one or any combination or set of codes and/or instructions on a machine-readable medium and/or computer readable medium, which can be incorporated into a computer program product.

The above description of illustrated embodiments of the subject disclosure, including what is described in the Abstract, is not intended to be exhaustive or to limit the disclosed embodiments to the precise forms disclosed. While specific embodiments and examples are described herein for illustrative purposes, various modifications are possible that are considered within the scope of such embodiments and examples, as those skilled in the relevant art can recognize.

In this regard, while the disclosed subject matter has been described in connection with various embodiments and corresponding Figures, where applicable, it is to be understood that other similar embodiments can be used or modifications and additions can be made to the described embodiments for performing the same, similar, alternative, or substitute function of the disclosed subject matter without deviating therefrom. Therefore, the disclosed subject matter should not be limited to any single embodiment described herein, but rather should be construed in breadth and scope in accordance with the appended claims below.

What is claimed is:

1. A system, comprising:
   a memory storing executable components; and
   a processor, communicatively coupled to the memory, that facilitates execution of the executable components comprising:
   a feedback processor configured to receive a set of partial channel state information as feedback of an interference network comprising a number of data streams in a multiple input multiple output (MIMO) channel, and to facilitate interference alignment of the number of data streams in the MIMO channel, wherein the partial channel state information comprises channel data representing channel fading matrix coefficients associated with transmissions from a transmitter device to a receiver device;
   a feedback dimension processor configured to determine a feedback cost by determining a feedback dimension defined as a sum of dimensions of Grassmanian manifolds applied to the number of data streams in the MIMO channel, the feedback cost being a cost of communicating the set of partial channel state information as the feedback, wherein the feedback is determined according to the feedback cost; and
   a precoder processor configured to encode a signal in a data stream of the number of data streams as a function of the set of partial channel state information.

2. The system of claim 1, wherein the feedback processor is configured to determine the feedback by characterizing the set of partial channel state information from an aggregate of channel state information with a feedback function.

3. The system of claim 2, wherein the executable components further comprise a feedback profile processor configured to determine a feedback profile that generates a parameterization of the feedback function based on a tradeoff and a reduction of the feedback cost.

4. The system of claim 3, wherein the executable components further comprise a trade-off processor configured to determine the trade-off as a function of the number of data streams, a number of antenna resources, and the feedback cost, according to a degree of freedom for the number of data streams.

5. The system of claim 4, wherein the trade-off processor is further configured to reduce the feedback cost associated with the feedback of the set of partial channel state information.

6. The system of claim 3, wherein the feedback profile processor is further configured to determine the feedback profile according to a transformation invariant property.

7. The system of claim 2, wherein the feedback function determines an amount of channel state information to retrieve as the set of partial channel state information and is independent of a quantization of channel state information in the multiple input multiple output channel.

8. The system of claim 1, wherein the executable components further comprise a feasibility processor configured to determine a feasibility condition that is a function of the set of partial channel state information and the number of data streams.

9. The system of claim 1, wherein the feedback dimension processor is further configured to measure the set of partial channel state information at a transmitter, and wherein the feedback cost is proportional to a total number of bits allocated for communicating the feedback.

10. The system of claim 1, wherein the feedback dimension processor is further configured to quantify the feedback as a first order measurement of channel state information overhead.

11. The system of claim 10, wherein the feedback dimension processor is further configured to generate the feedback cost as representing the sum of the dimensions of the Grassmannian manifolds comprising channel state information feedback matrices.

12. The system of claim 1, wherein the set of partial channel state information comprises approximately one-sixth of all cross link channel matrices of the interference network.

13. A device, comprising:
a memory storing executable components; and
a processor, communicatively coupled to the memory, that facilitates execution of the executable components comprising:
a feedback component configured to communicate a portion of channel state information as feedback of an interference network comprising a number of data streams in a multiple input multiple output (MIMO) channel, and to achieve interference alignment of the number of data streams in the MIMO channel, wherein the portion of the channel state information comprises channel data representing channel fading matrix coefficients associated with transmissions from a transmitter device to a receiver device;
a feedback dimension component configured to determine a feedback cost by determining a feedback dimension defined as a sum of dimensions of Grasmanian manifolds applied to the number of data streams in the MIMO channel, the feedback cost being a cost of communicating the portion of channel state information as the feedback, wherein the feedback is determined according to the feedback cost; and
a decorrelator component configured to decode a signal in a data stream as a function of the portion of channel state information.

14. The device of claim 13, wherein the executable components further comprise:
a feedback function component configured to determine the feedback by characterizing the portion of channel state information from an aggregate of channel state information with a feedback function that outputs a tuple of subspaces where each subspace corresponds to a point in an associated Grassmannian manifold.

15. The device of claim 14, wherein the portion of channel state information comprises a set of direction information of cross link channel matrices detected by a set of receivers of the interference network, and the set of receivers is configured to generate a tuple of the portion of channel state information based on the set of direction information according to the feedback function.

16. The device of claim 14, wherein the executable components further comprise:
a feedback profile component configured to determine a feasible feedback profile that determines a set of parameters of the feedback function that comprises a number of elements in a tuple of detected local cross-link channel state information matrices.

17. The device of claim 16, wherein the feedback profile component is further configured to derive the feasible feedback profile via a low complexity greedy algorithm for a number of degrees of freedom.

18. The device of claim 16, wherein the feedback profile component is further configured to determine the feasible feedback profile that satisfies a feasible condition constrained by the portion of channel state information based on a trade-off.

19. The device of claim 13, wherein the executable components further comprise:
a trade-off component configured to determine a trade-off as a function of the number of data streams, a number of antenna resources, and the feedback cost, according to a degree of freedom requirement.

20. The device of claim 13, wherein the feedback comprises at least one of: no feedback associated with a subset of cross link channel state information, feedback of aggregate channel state information for the subset of cross link channel state information, feedback of a null space of a sub-matrix of channel state information for the subset of cross link channel state information, or feedback of a row space of channel state information matrices for the subset of cross link channel state information.

21. A method comprising:
selecting, by a device comprising a processor, a portion of channel state information from among an aggregate of channel state information in a multiple input multiple output (MIMO) channel;
determining a feedback cost of feedback that comprises the portion of channel state information, by determining a feedback dimension defined as a sum of dimensions of Grasmanian manifolds applied to a number of data streams in the MIMO channel, the feedback cost being a cost of communicating the portion of partial channel state information as the feedback, wherein the feedback is determined according to the feedback cost;
communicating, by the device, the feedback for interference alignment of the number of data streams in the MIMO channel, wherein the portion of channel state information comprises channel data representing channel fading matrix coefficients associated with transmissions from a transmitter device to a receiver device; and decoding, by the device, a signal in a data stream of the number of data streams as a function of the portion of channel state information.

22. The method of claim 21, further comprising:
wherein the Grassmannian manifolds comprise channel state information matrices of the aggregate of channel state information.

23. The method of claim 21, further comprising:
determining the feedback by characterizing the portion of channel state information with a feedback function that determines the portion of channel state information from the aggregate of channel state information without a quantization data.

24. The method of claim 23, wherein the portion of channel state information comprises a set of direction information of cross link channel matrices.

25. The method of claim 24, further comprising:
generating a tuple of the portion of channel state information based on the set of direction information according to the feedback function.

26. A method, comprising:
receiving, by a device comprising a processor in a multiple input multiple output (MIMO) channel, a portion of channel state information from among an aggregate of channel state information;
analyzing, by the device, the portion of channel state information as feedback of an interference network based on a feedback process defined to achieve interference alignment of a number of data streams in the MIMO channel, wherein the portion of the channel state information comprises channel data representing a matrix of channel fading coefficients associated with transmission from a transmission device to a receiver device;
determining, by the device, a feedback cost by determining a feedback dimension defined as a sum of dimensions of Grassmanian manifolds applied to the number of data streams in the MIMO channel, the feedback cost being a cost of communicating the portion of channel state information as the feedback, wherein the feedback is determined according to the feedback cost; and
encoding, by the device, a signal in a data stream of the number of data streams as a function of the portion of channel state information.

27. The method of claim 26, further comprising
determining the feedback process by characterizing the portion of channel state information from the aggregate of channel state information with a feedback function that outputs a tuple of subspaces of the portion of channel state information; and
generating a feasible feedback profile that determines a set of parameters of the feedback function that satisfies a feasibility condition based on the portion of channel state information, wherein the feasibility condition is dependent upon a trade-off.

28. The method of claim 27, further comprising:
determining the trade-off as a function of the number of data streams, a number of antenna resources of the multiple input multiple output channel, and the feedback cost associated with communicating the feedback, according to a degree of freedom of the MIMO channel.

29. The method of claim 28, further comprising:
reducing the feedback cost associated with the communicating the feedback as a function of the portion of channel state information via the trade-off.

30. The method of claim 28, wherein the feedback profile determines the set of parameters for the feedback function based on at least one of: no feedback associated with a subset of cross link channel state information, feedback of aggregate channel state information for the subset of cross link channel state information, feedback of a null space of a sub-matrix of channel state information for the subset of cross link channel state information, or feedback of a row space of channel state information matrices for the subset of cross link channel state information.

31. The method of claim 28, further comprising:
determining the feasibility condition based on the portion of channel state information;
determining a feasibility of the feedback profile; and
performing the interference alignment of the number of data streams with the portion of channel state information in the MIMO channel based on the feasibility of the feedback profile.

* * * * *